United States Patent
Heald

(10) Patent No.: US 8,040,590 B2
(45) Date of Patent: Oct. 18, 2011

(54) INTERFEROMETRIC MODULATION DEVICES HAVING TRIANGULAR SUBPIXELS

(75) Inventor: David Leslie Heald, Solvang, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 0 days.

(21) Appl. No.: 12/589,928

(22) Filed: Oct. 29, 2009

(65) Prior Publication Data

US 2011/0105185 A1   May 5, 2011

(51) Int. Cl.
G02B 26/00 (2006.01)

(52) U.S. Cl. ............................................. 359/292

(58) Field of Classification Search ............... 359/292, 359/290, 291, 295, 298, 260, 223, 224, 320, 359/322; 345/84
See application file for complete search history.

(56) References Cited

U.S. PATENT DOCUMENTS

| | | | |
|---|---|---|---|
| 3,936,816 A * | 2/1976 | Murata | |
| 4,781,438 A * | 11/1988 | Noguchi | |
| 4,969,718 A * | 11/1990 | Noguchi et al. | |
| 5,485,293 A * | 1/1996 | Robinder | |
| 5,850,274 A | 12/1998 | Shin et al. | |
| 7,006,109 B2 * | 2/2006 | Toji et al. | 345/613 |
| 7,542,197 B2 * | 6/2009 | Ishii et al. | |
| 7,583,279 B2 * | 9/2009 | Brown et al. | 345/694 |
| 7,719,500 B2 * | 5/2010 | Chui | 345/84 |
| 2005/0094241 A1 * | 5/2005 | Ishii | |
| 2006/0087713 A1 | 4/2006 | Whitehead, Jr. et al. | |
| 2006/0170712 A1 | 8/2006 | Miller et al. | |
| 2006/0290870 A1 | 12/2006 | Kwak et al. | |
| 2009/0102768 A1 | 4/2009 | Shimizu | |

FOREIGN PATENT DOCUMENTS

| | | | |
|---|---|---|---|
| CN | 1776450 | * | 5/2006 |
| CN | 101153932 | * | 4/2008 |
| EP | 1640961 | | 3/2006 |
| JP | 2006234870 | | 9/2006 |

OTHER PUBLICATIONS

International Search Report and Written Opinion dated Mar. 22, 2011, from Application No. PCT/US2010/052909.

* cited by examiner

*Primary Examiner* — Ricky Mack
*Assistant Examiner* — Tuyen Tra
(74) *Attorney, Agent, or Firm* — Weaver Austin Villeneuve & Sampson LLP

(57) ABSTRACT

At least some subpixels in an interferometric modulator display are formed in a triangular shape. Such triangular subpixels may be formed and/or addressed in a variety of manners. At least some individual triangular subpixels may be separately addressable. However, a plurality of triangular subpixels may be addressable as a group, e.g., as a group of 2, 3, 4 or more. A single pixel may include varying numbers of triangular subpixels. For example, a single pixel may include 3, 6, 9, 12, 15, 18, 21 or some other number of triangular subpixels. Alternatively, a single pixel may include 4, 8, 12, 16, 20, or some other number of triangular subpixels. A single pixel may include triangular subpixels that are configured to be separately addressable and/or triangular subpixels are configured to be addressable as a group.

26 Claims, 22 Drawing Sheets
(8 of 22 Drawing Sheet(s) Filed in Color)

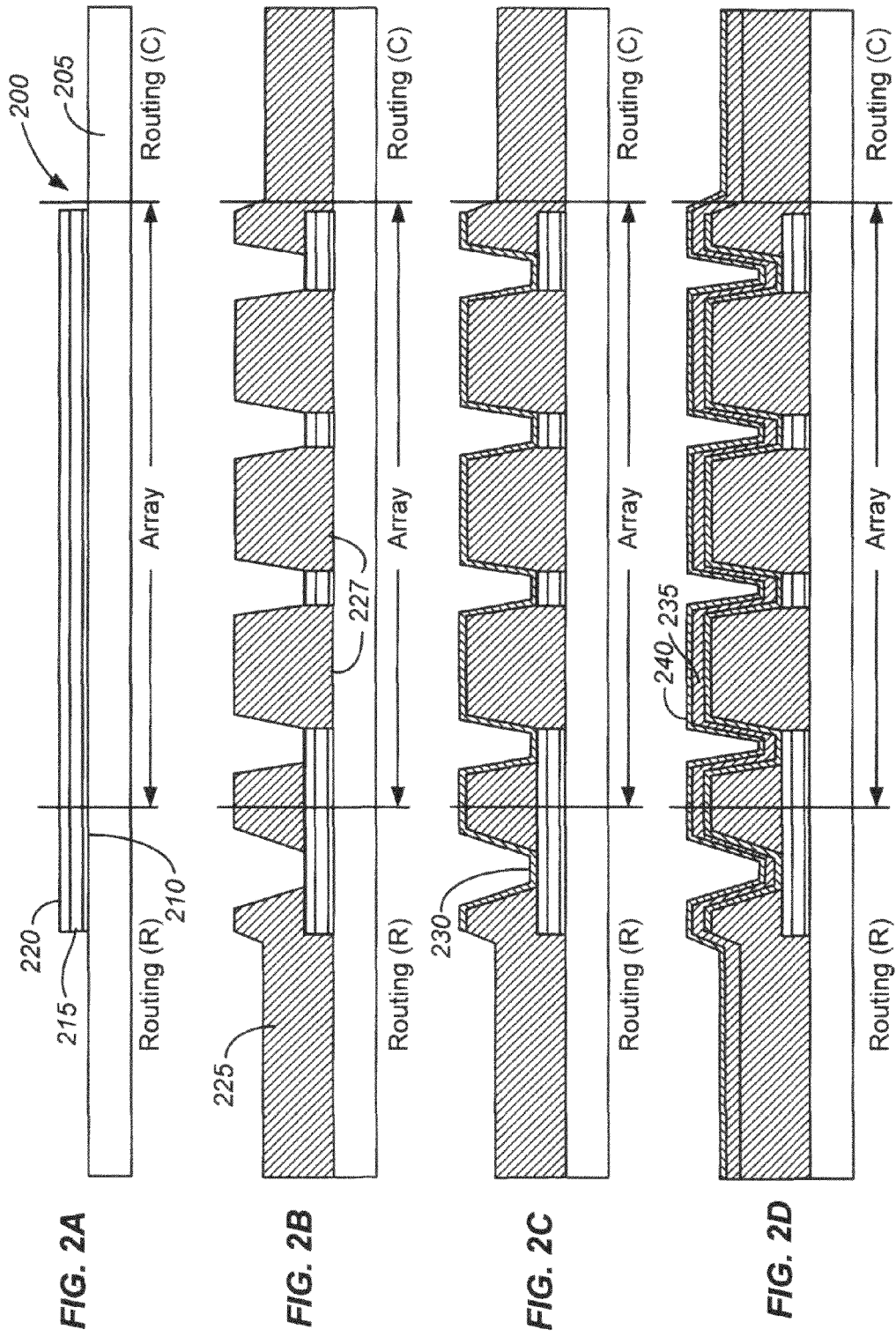

Black Matrix (BM) Layer

Metal 1 (M1) Layer

Mechanical (Mech) Layer

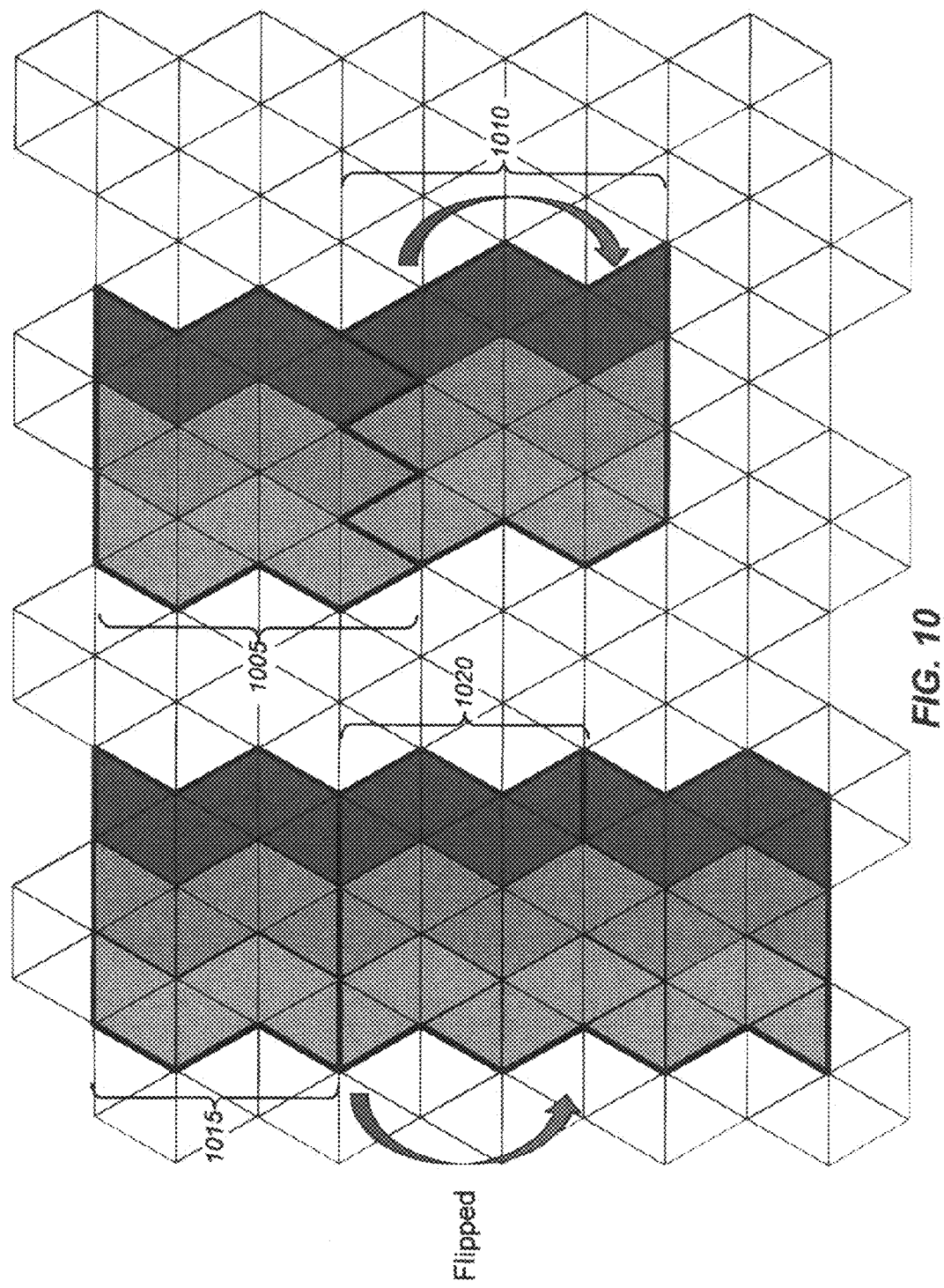

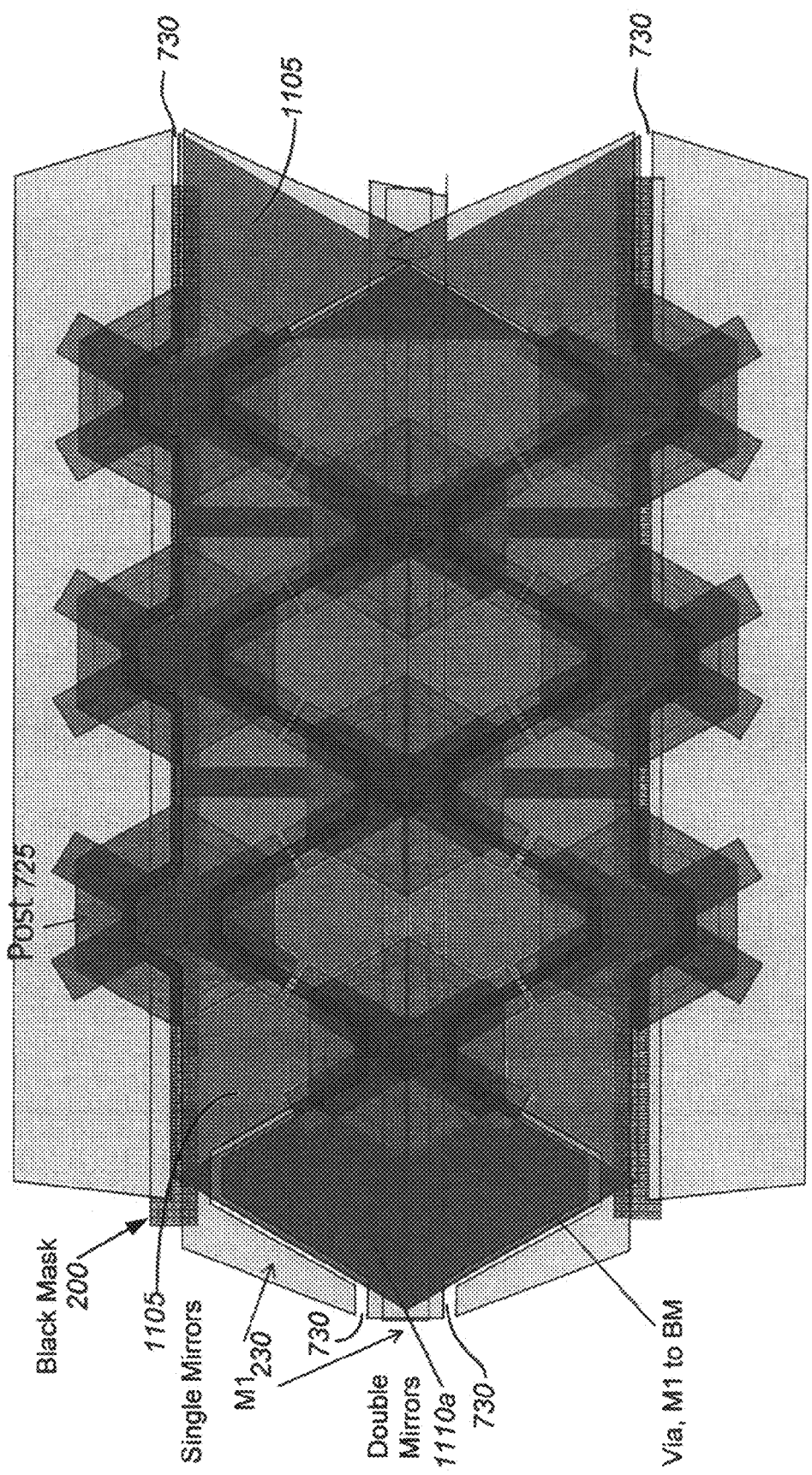

INTERFEROMETRIC MODULATION DEVICES HAVING TRIANGULAR SUBPIXELS

FIELD OF THE INVENTION

This application relates generally to display technology and more specifically to subpixel design.

DESCRIPTION OF RELATED TECHNOLOGY

Microelectromechanical systems ("MEMS") include micromechanical elements, actuators, and electronics. Micromechanical elements may be created using depositions that add layers, etching, and/or other micromachining processes that etch away parts of substrates and/or deposited material layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator.

In recent years, the present assignee has developed a variety of interferometric modulator designs, many of which are intended for use in display devices. Such devices have a wide range of applications, and it would be beneficial to use and/or modify the characteristics of these types of devices so that their features can be exploited in improving existing products and creating new products that have not yet been developed. It would be desirable to provide improved designs for interferometric modulators and associated display devices. In particular, it would be desirable to provide interferometric modulators with increased brightness.

SUMMARY

Improved interferometric modulators are provided herein. In some embodiments, at least some subpixels in an interferometric modulator display are formed in a triangular shape. Arrays of triangular subpixels described herein can be formed with a greater active area than arrays of square subpixels. Accordingly, displays that include an array of triangular subpixels can provide increased brightness.

Such triangular subpixels may be formed and/or addressed in a variety of manners. In some embodiments, for example, at least some individual triangular subpixels are configured to be separately addressable. In some embodiments, a plurality of triangular subpixels are configured to be addressable as a group, e.g., as a group of 2, 3, 4 or more.

Depending on the embodiment, a single pixel may include varying numbers of triangular subpixels. For example, a single pixel may include 3, 6, 9, 12, 15, 18, 21 or some other number of triangular subpixels. Alternatively, a single pixel may include 4, 8, 12, 16, 20, or some other number of triangular subpixels.

Moreover, a single pixel may include triangular subpixels that are configured to be separately addressable and/or triangular subpixels are configured to be addressable as a group. For example, a single pixel may include separately addressable triangular subpixels, triangular subpixels that are configured to be addressed in pairs, triangular subpixels that are configured to be addressed in groups of 3 or 4, etc. Subpixels of the same color may be organized substantially into columns, though the columns are not necessarily formed of straight lines. A row of subpixels may be separately addressable or the row may be addressed along with one or more other rows.

For example, some devices provided herein include control circuitry that is configured to control 18 triangular subpixels as a single pixel. Some such devices include 6 red triangular subpixels, 6 green triangular subpixels and 6 blue triangular subpixels. The control circuitry may be configured to address the subpixels individually and/or in groups, e.g., groups of 2, 3 and/or 4 triangular subpixels of each color. Alternative devices described herein include control circuitry that is configured to control 21 triangular subpixels as a single pixel. Some such devices include 7 red triangular subpixels, 7 green triangular subpixels and 7 blue triangular subpixels. The control circuitry may be configured to address the subpixels individually and/or in groups, e.g., groups of 1, 2, 3 and/or 4 triangular subpixels of each color.

Some embodiments described herein provide an apparatus that includes the following elements: a substantially transparent substrate; an array of triangular interferometric modulation subpixels disposed on the substantially transparent substrate; and apparatus for controlling the array. The control apparatus may include a plurality of electrodes configured for conducting electrical signals to the array of subpixels and control circuitry configured to apply electrical signals for controlling the array of subpixels via the plurality of electrodes. The subpixels may comprise two substantially triangular walls that define a cavity, one of the walls being movable relative to the other through a range of positions. The walls may cause the cavity to operate interferometrically in at least one of the positions, producing a predetermined optical response to visible light that enters the subpixels.

The control circuitry may be configured to control varying numbers of subpixels as a single pixel, depending on the particular embodiment. For example, the control circuitry may be configured to control 3, 4, 6, 8, 9, 12, 15, 16, 18, 20 or 21 of the subpixels as a single pixel. If the control circuitry is configured to control 18 subpixels as a single pixel, the single pixel may include 6 red subpixels, 6 green subpixels and 6 blue subpixels. If the control circuitry is configured to control 21 subpixels as a single pixel, the single pixel may include 7 red subpixels, 7 green subpixels and 7 blue subpixels. In some such embodiments, the control circuitry may be configured to address 4 of the 7 red subpixels as a group.

The plurality of electrodes may comprise column electrodes configured for conducting electrical signals to a column of subpixels. Each subpixel in the column of subpixels may be configured to produce substantially the same color.

The plurality of electrodes may include first row electrodes configured for conducting electrical signals to single subpixels; and second row electrodes configured for conducting electrical signals to groups of 2 subpixels. The plurality of electrodes may also include third row electrodes configured for conducting electrical signals to groups of 4 subpixels.

A display device may include one or more of the above-described devices. For example, one or more of the above-described devices may include the following: a display; a processor that is configured to communicate with the display, the processor being configured to process image data; and a memory device that is configured to communicate with the processor. In some embodiments, the display device may be part of a mobile communication device.

The display device may also include a driver circuit configured to send at least one signal to the display. The display device may include a controller configured to send at least a portion of the image data to the driver circuit. The display device may include an image source module configured to send the image data to the processor. The image source module may comprise at least one of a receiver, transceiver, and transmitter. The display device may include an input device configured to receive input data and to communicate the input data to the processor.

Various methods are also described herein. Some such methods include the following steps: forming black mask areas and triangular active areas on a substantially transparent substrate; making an array of triangular interferometric modulation subpixels on the black mask areas and triangular active areas; and configuring a plurality of electrodes for conducting electrical signals to the array of subpixels. The subpixels may comprise two substantially triangular walls that define a cavity, one of the walls being movable relative to the other through a range of positions. The walls may cause the cavity to operate interferometrically in at least one of the positions, producing a predetermined optical response to visible light that enters the active areas.

The configuring process may involve making a plurality of cuts along the sides of at least some of the subpixels. The forming process may involve forming the black mask areas, at least in part, of conductive material that forms part of the plurality of electrodes. The making process may involve depositing a partially reflective and partially conductive material on the black mask areas and triangular active areas. The partially reflective and partially conductive material may form part of the plurality of electrodes.

The configuring process may involve forming column electrodes configured for conducting electrical signals to a column of subpixels. Each subpixel in the column of subpixels may be configured to produce substantially the same color.

The configuring process may involve forming electrodes configured for conducting electrical signals to individual subpixels. Alternatively, or additionally, the configuring process may involve forming electrodes configured for conducting electrical signals to groups of 2, 3, 4 or more subpixels. The making process may involve making 3 or 4 different subpixel cavity sizes, each of the subpixel cavity sizes corresponding to a subpixel color.

Some such methods may involve configuring control circuitry to apply electrical signals to control the array of subpixels via the plurality of electrodes. Depending on the implementation, the control circuitry may be configured to control varying numbers of subpixels as a single pixel. For example, the control circuitry may be configured to control 3, 6, 9, 12, 15, 18, 21 or some other number of subpixels as a single pixel. Alternatively, the control circuitry may be configured to control 4, 8, 12, 16, 20, or some other number of triangular subpixels as a single pixel.

Some methods described herein may involve forming a display device that includes an array of triangular interferometric modulation subpixels. Some such methods may involve forming a mobile communication device that includes such a display device.

These and other methods of the invention may be implemented by various types of hardware, software, firmware, etc. For example, some features of the invention may be implemented, at least in part, by computer programs embodied in machine-readable media. The computer programs may, for example, include instructions for controlling one or more devices to fabricate an interferometric modulator that includes an array of triangular subpixels, to make a display device that includes such an array, to make a device that includes such a display device, etc. Alternatively, or additionally, the computer programs may include instructions for addressing an array of triangular subpixels.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A through 2D depict cross-sections through a substrate during the initial stages of the process outlined in FIG. 1.

FIG. 10 depicts interferometric modulator pixels that include groupings of 18 triangular subpixels and 21 triangular subpixels.

FIG. 11A depicts apparatus for separately addressable triangular subpixels and triangular subpixels addressable in groups of 1 and 2, according to some embodiments.

DETAILED DESCRIPTION

While the present invention will be described with reference to a few specific embodiments, the description and specific embodiments are merely illustrative of the invention and are not to be construed as limiting the invention. Various modifications can be made to the described embodiments without departing from the true spirit and scope of the invention as defined by the appended claims. For example, the steps of methods shown and described herein are not necessarily performed in the order indicated. It should also be understood that the methods of the invention may include more or fewer steps than are indicated. In some implementations, steps described herein as separate steps may be combined. Conversely, what may be described herein as a single step may be implemented in multiple steps.

Similarly, device functionality may be apportioned by grouping or dividing tasks in any convenient fashion. For example, when steps are described herein as being performed by a single device (e.g., by a single logic device), the steps may alternatively be performed by multiple devices and vice versa. Moreover, the specific materials, dimensions, etc., described herein are provided merely by way of example and are in no way limiting.

Figure 1:
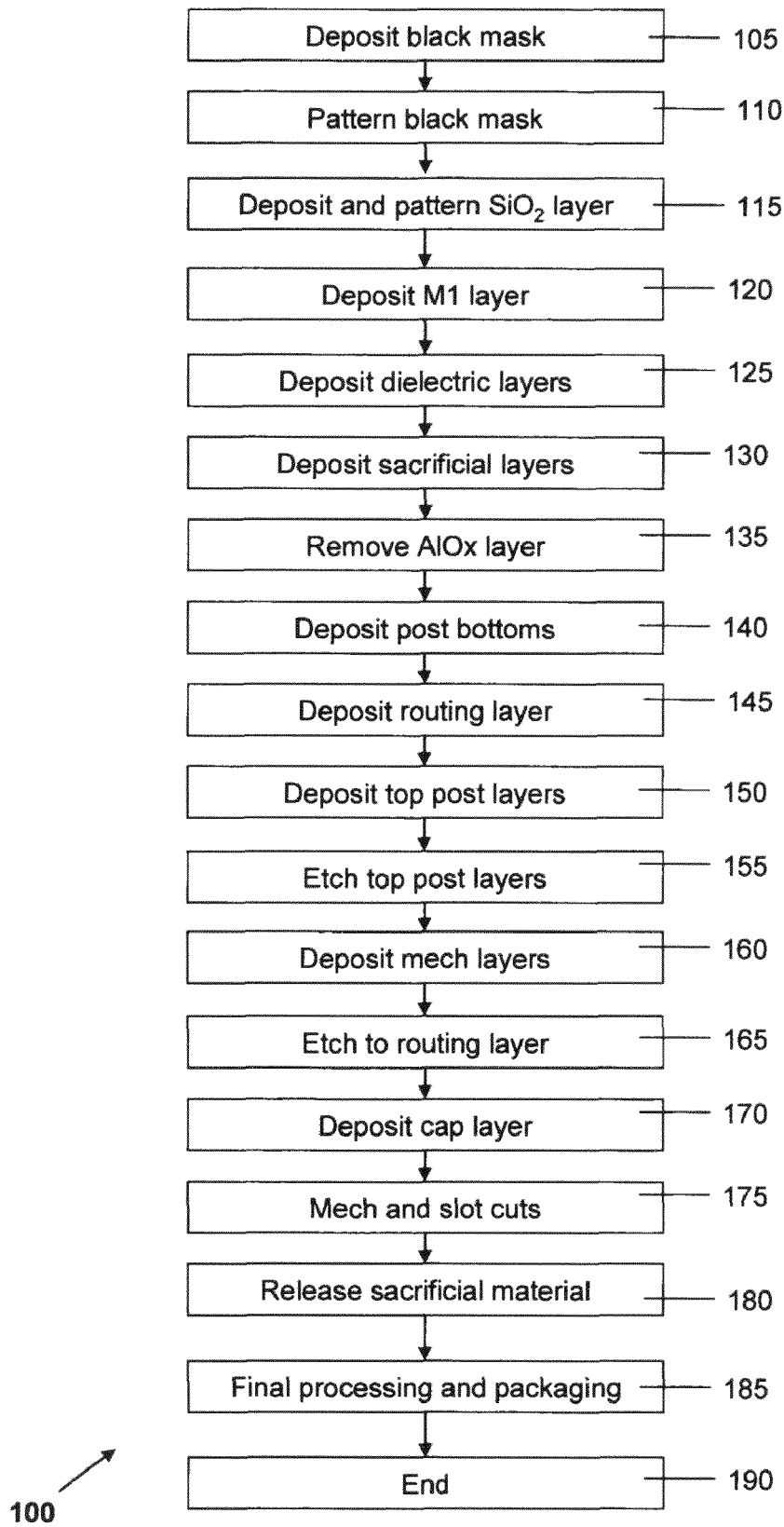
FIG. 1 is a flow chart that outlines one example of a process of forming an array of subpixels for an interferometric modulator device.
Figures 3A, 3B, 3C, 3D:
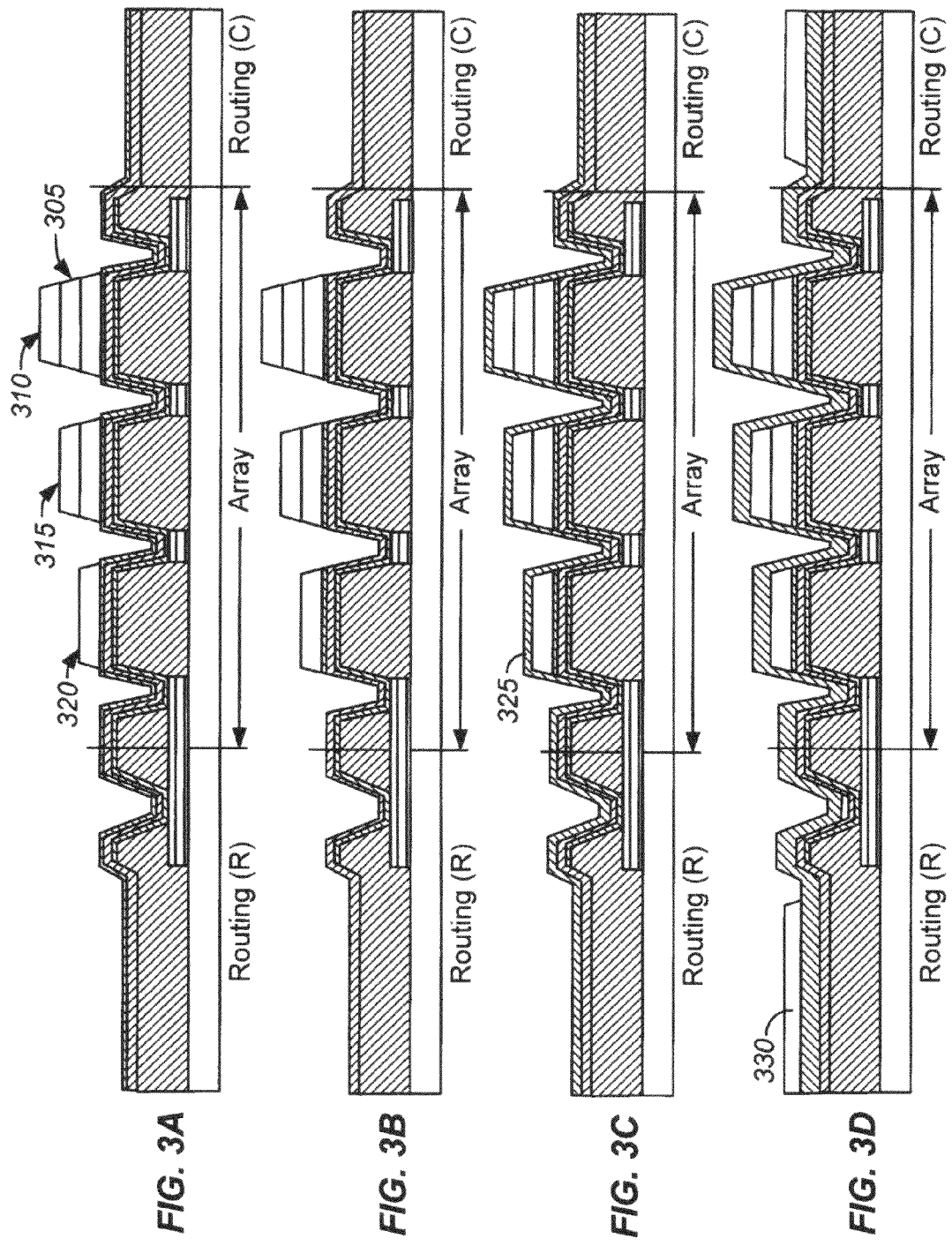
FIGS. 3A through 3D depict cross-sections through the substrate during the next stages of the process outlined in FIG. 1.
Figure 4A:
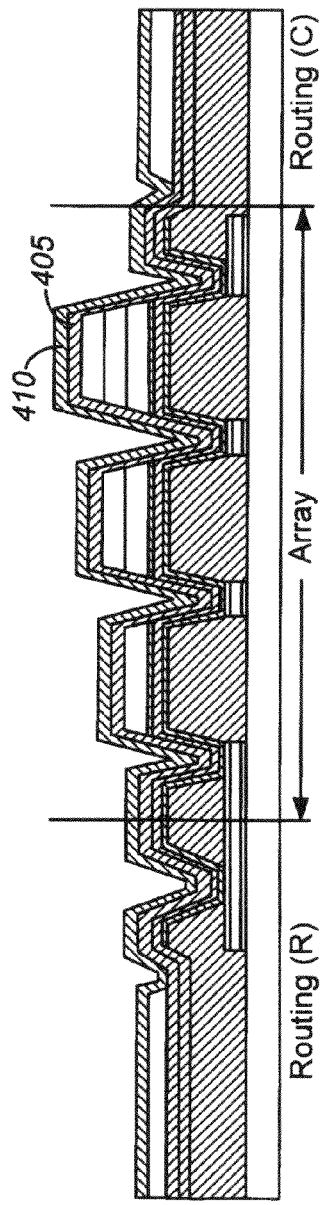
FIGS. 4A through 4C depict cross-sections through the substrate during the next stages of the process outlined in FIG. 1.
Figure 4B:
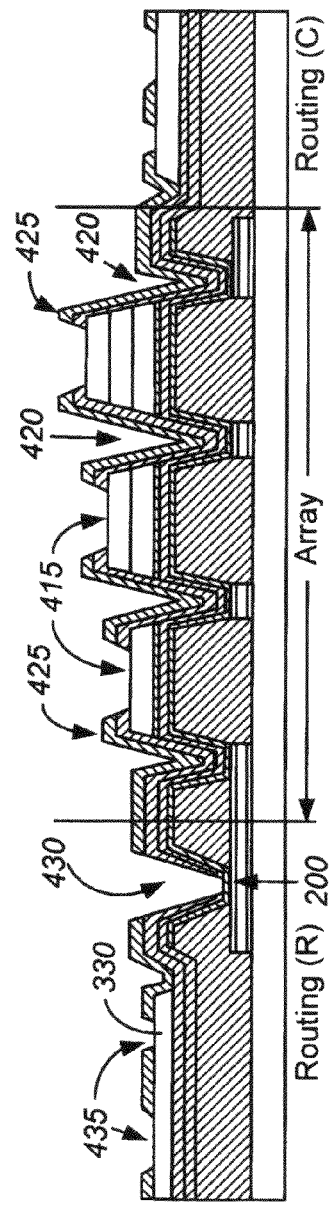
Figure 4C:
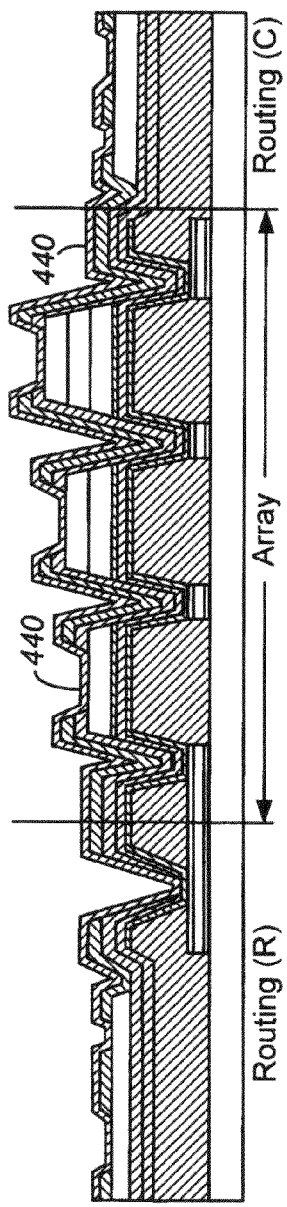
Figures 5A, 5B, 5C:
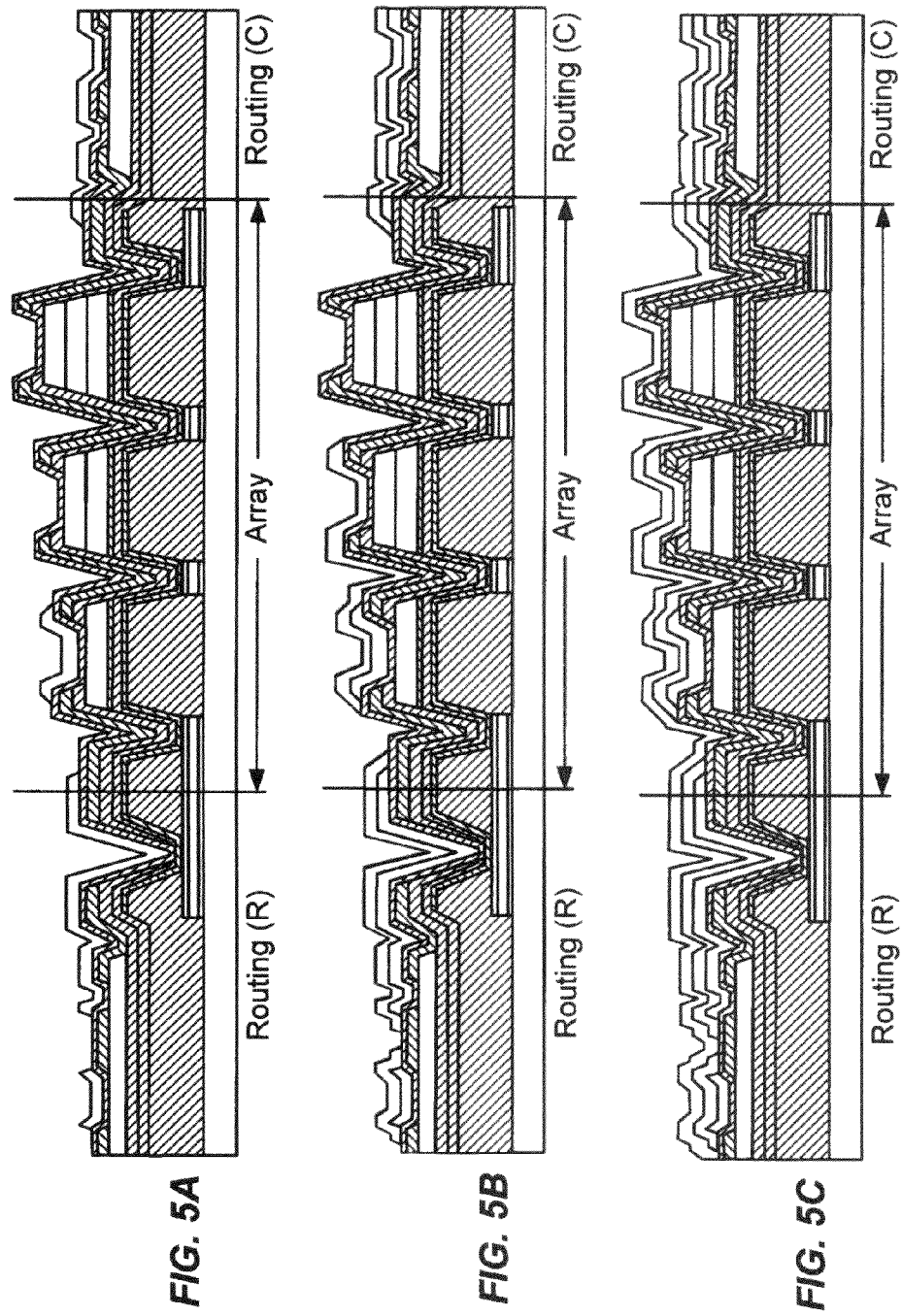
FIGS. 5A through 5C depict cross-sections through the substrate during the next stages of the process outlined in FIG. 1.
Figure 6A:
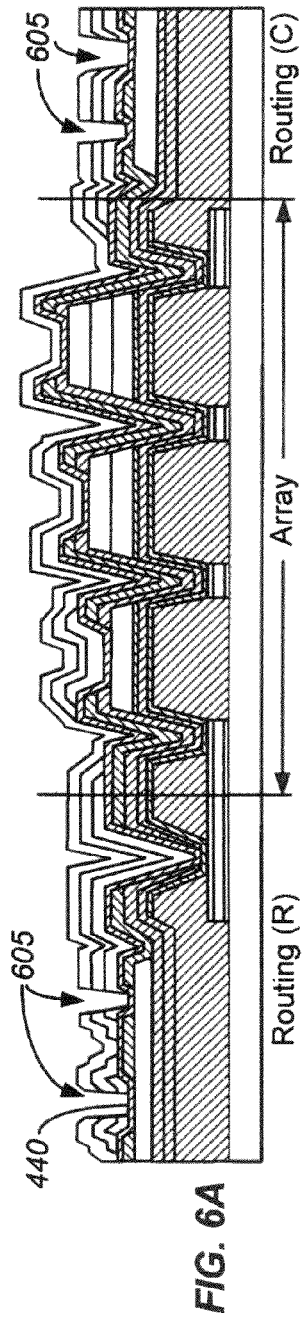
FIGS. 6A through 6C depict cross-sections through the substrate during the next stages of the process outlined in FIG. 1.
Figure 6B:
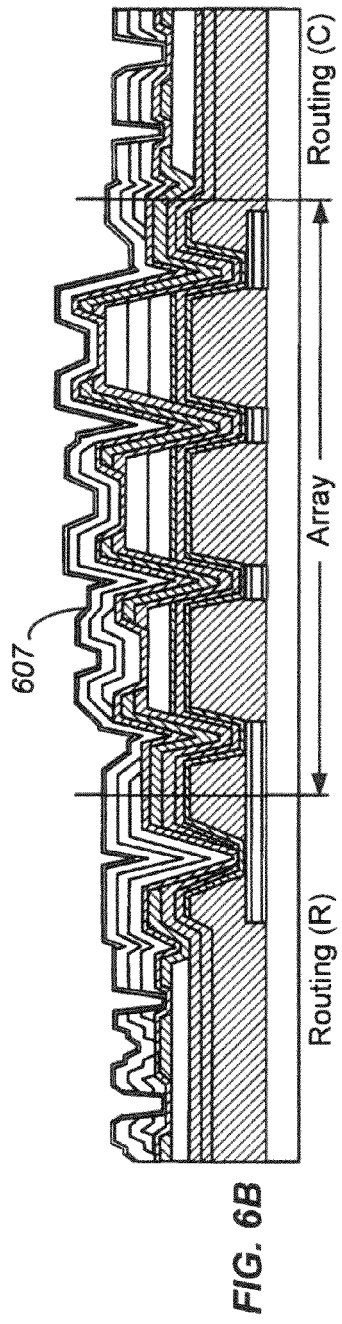
Figure 6C:
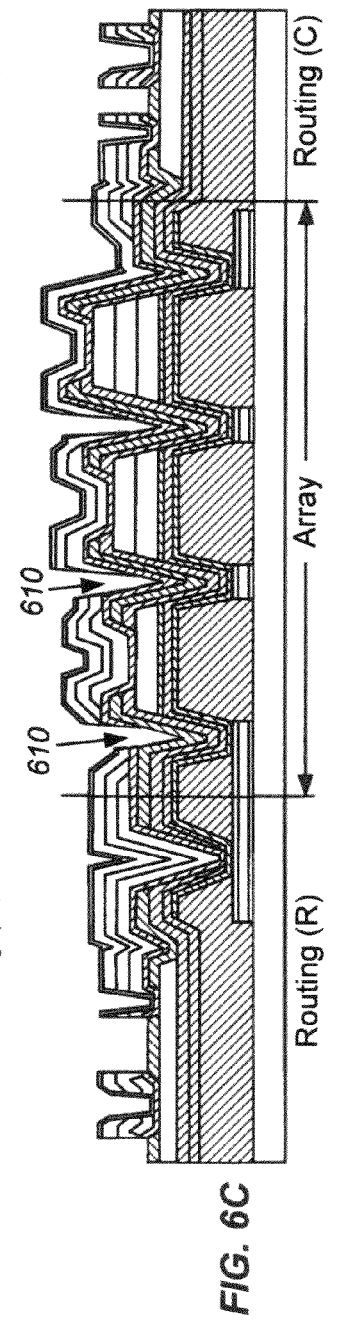

Some methods of the invention will now be described with reference to FIGS. 1 through 6C. FIG. 1 is a flow chart that outlines one example of a process of forming an array of subpixels for an interferometric modulator device. FIGS. 2A through 6C depict cross-sections through a subpixel array and routing elements during various stages in the process outlined in FIG. 1. Accordingly, the following description will describe particular examples of the steps of FIG. 1 with reference to FIGS. 2A through 6C.

In step 105 of FIG. 1, black mask 200 is deposited on substantially transparent substrate 205 (see FIG. 2A). Black mask 200 can provide various functions in the displays described herein. One function of black mask 200 is to block light from certain areas of a display. For example, a subpixel of an interferometric modulator display generally has a post in each corner. As described and illustrated elsewhere herein, a column of subpixels may be mechanically and electrically isolated from the adjacent columns by cutting the mechanical or "mech" layer, which includes the reflective micromirrors of the interferometric modulator display. It is not desirable to have light reflecting from the post or other support structures. Therefore, black mask 200 may be disposed underneath the posts and other areas, such as the mech cuts, other cuts known as "slot cuts," etc. The black mask may also be used to block light from the "bending region" of the mechanical layer near the posts, which is not flat when the mechanical layer is activated.

In this example, a thin etch stop ($Al_2O_3$) layer is deposited first. (This etch stop layer is not illustrated in FIG. 2A.) Partially reflective molychrome (MoCr) layer 210 is laid down on the etch stop layer. Some light will reflect from molychrome layer 210. Next, oxide layer 215 (which is $SiO_2$ in this example) is deposited, then reflective and conductive layer 220. In this example, layer 220 is an AlSi layer, which is thick enough to be completely reflective. The thickness of layer 215 is selected such that visible light reflected from AlSi layer 220 destructively interferes with the partially reflected light from molychrome layer 210.

However, it is desirable to have light reflecting from the remaining portions of the interferometric modulator display. Therefore, in step 110, black mask 200 is patterned and removed from these "active areas" 227.

The percentage of the active area, as compared to the total area, of the display is sometimes referred to as the "fill factor." From a fill factor viewpoint, the areas of the display covered by the black mask may be considered parasitic, because they cut down on the overall brightness of the reflected light.

Many of the triangular subpixel embodiments described herein result in an increased fill factor and therefore increased brightness, as compared to interferometric modulator displays having square subpixels of the same subpixel area. Some comparisons are described below with reference to FIG. 12D.

Triangular subpixels may potentially provide further enhancements. For example, triangular subpixels may have a smaller contact area just outside the bending region, as compared to a square subpixel. This smaller contact area may reduce stiction. Some triangular subpixels may be fabricated to have a smaller bending region, as compared to that of a square subpixel. A smaller bending region would allow the black mask area to be further reduced, thereby further increasing the fill factor and brightness of the display.

Figure 7A:
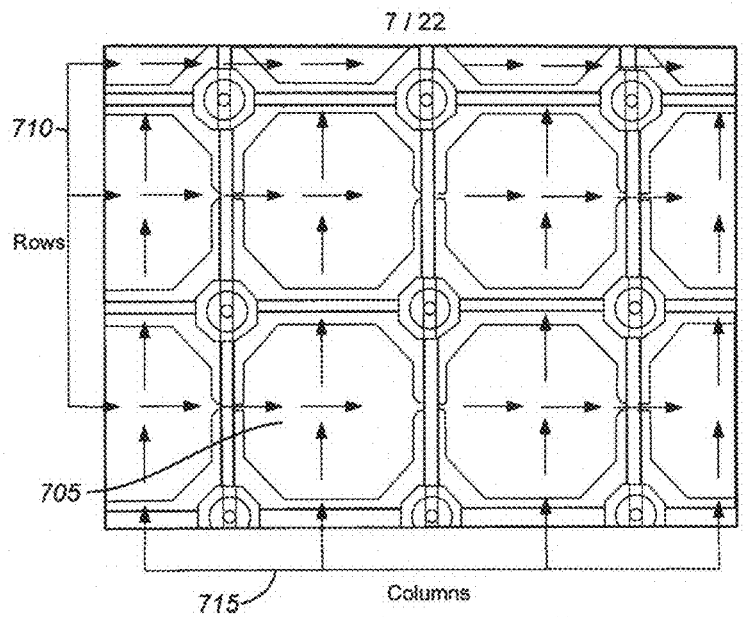
FIGS. 7A through 7D depict a portion of the electrodes for addressing rows and columns of substantially square subpixels.
Figure 7B:
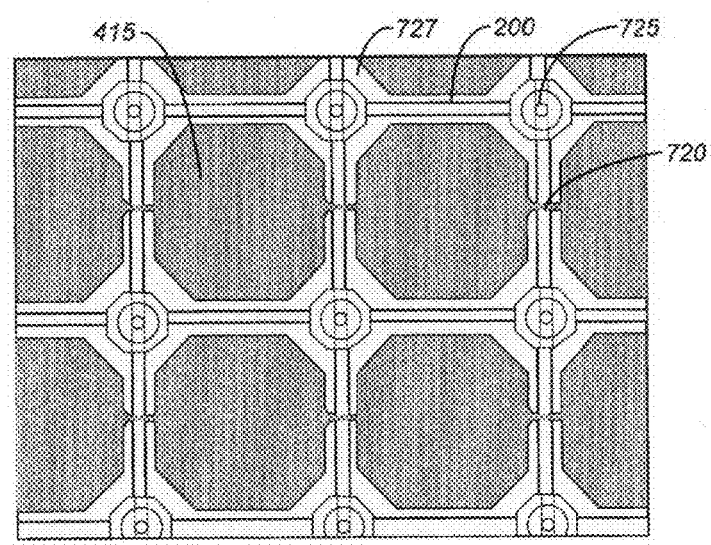

Step 110 may also involve forming gaps in black mask 200, e.g., as depicted in FIG. 7B. These gaps are formed in accordance with a second function of black mask 200, which is to form part of the circuitry of the subpixel array. Black mask 200 is sufficiently conductive to convey signals, in the form of changes in voltage, to subpixels and/or groups of subpixels in the array. Accordingly, in some embodiments black mask 200 may form a portion of what may be referred to herein as the "electrodes" in the subpixel array. Gaps may be formed in black mask 200 to electrically isolate portions of the black mask from one another.

In step 115 of FIG. 1, $SiO_2$ layer 225 is deposited, and then vias are etched through $SiO_2$ layer 225 to AlSi layer 220. Partially conductive and partially reflective layer 230, which is another molychrome layer in this example, is then deposited. (See FIG. 2C and step 120 of FIG. 1.) Layer 230, which may sometimes be referred to herein as "M1," forms a portion of the electrodes in the subpixel array in some implementations, and also the partial reflector for the active area of the subpixel.

As noted above, in some embodiments "mech cuts" divide the mechanical layer into columns. In some embodiments, these mech cuts mechanically and/or electrically isolate the columns. In some such embodiments, row electrodes form the other main part of the electrode system. If a voltage is applied to a column and a row, a subpixel (or a group of subpixels) will be driven: the coincident application of voltages pulls the mechanical layer's mirror down in that subpixel. When the mirror is in this position, interference between light reflected from the subpixel's mirror and light reflected from the molychrome layer makes the subpixel appear black to a human observer.

In such embodiments, the row electrodes include conductive layer 230, which is a thin layer of molychrome in this example. In some instances, the molychrome layer may be on the order of 50 angstroms thick. Molychrome is a relatively high-resistance material. Accordingly, the vias that are formed down to the conductive AlSi layer 220 of the black mask in step 115 effectively increase the overall conductivity of the overlying molychrome layer 230. Therefore, electrical signals may be carried across many pixels, e.g., from one routing side of the subpixel array to the other side of the subpixel array via this conductive AlSi layer 220 of the black mask. If molychrome layer 230 is connected to the conductive AlSi layer 220 of the black mask in the vias adjacent to each subpixel, the higher-resistance layer 230 may be used to convey electrical signals from the edge of the subpixel to the center of the subpixel. This distance may be made small enough that the signal transmission time associated with transmission through this higher-resistance layer 230 can be kept within acceptable limits.

In this example, dielectric layers 235 and 240 of FIG. 2D are then deposited on the M1 layer. (See step 125 of FIG. 1.) Here, layer 235 is composed of $SiO_2$ and layer 240 is composed of aluminum oxide. These two layers will form part of the optical gap that will control the color and the dark state of each subpixel. Light that enters the bottom of the stack from substantially transparent substrate 205 will be partially reflected from, and partially transmitted by, M1 layer 230.

In order to have subpixels that can produce three different colors, 3 different gaps are formed between the reflective mirror at the bottom of the mechanical layer and the top of the optical oxide stack. Accordingly, differing amounts of sacrificial material 305 is deposited to form each subpixel type. (See step 130 of FIG. 1 and FIG. 3A.) Any suitable sacrificial material may be used, such as molybdenum. In order to form the deepest cavities 310, we deposit three sacrificial layers. In this example, cavities 310 (which may be referred to herein as "high gap" subpixels) are configured to produce a second-order blue color. Second-order colors are more saturated, though not as bright as first-order colors. Here, a single layer of sacrificial material 305 is deposited in the thinnest ("low gap") cavities 320, which are configured to produce a green color. In this example, two layers of sacrificial material 305 are deposited to form the "mid gap" subpixels 315, which are configured to produce a red color. Here, the layers of sacrificial material 305 are deposited one at a time. Photo-patterning is completed on one layer before the next layer is deposited.

In step 135, layer 240 is removed from areas outside of the subpixels. (See FIG. 3B.) Bottom post material 325 is then deposited. (See step 140 and FIG. 3C.) In this example, bottom post material 325 is formed from two layers, a lower layer of $SiO_2$ and an upper layer of silicon oxynitride ("SiON"). In step 145, a conductive layer 330 is deposited in the routing area outside of the subpixel array. (See FIG. 3D.) Layer 330, which is formed of AlSi in this example, reduces the resistance of the peripheral routing and makes it easier for signals from the control circuitry to reach the subpixel array.

Top post layers are deposited in step 150. (See FIG. 4A.) In this example, the top post layers include SiON layer 405 and $SiO_2$ layer 410. The post layers are removed from areas 415 of the subpixels in step 155. (See FIG. 4B.) In between the subpixels are the "column" portions of posts 420. The partially overlapping portions 425 of posts 420 are sometimes referred to as the "wings." In some embodiments, it is necessary to make contact to the black mask layer of the routing area for proper busing. Therefore, in step 155 material is removed down to black mask 200 in via 430 of the routing area (see FIG. 4B). Here, vias 435 are formed down to conductive layer 330 in other portions of the routing area.

The components of the mechanical layer are formed in step 160. First, a layer of reflective material 440 is deposited. (See FIG. 4C.) Reflective layer 440 forms the moveable mirror in each subpixel. In this example, reflective layer 440 is made of an aluminum alloy.

Ideally, one would like to apply substantially the same voltage to all 3 types of subpixels to make them actuate. Although this is not a necessary feature, it can simplify the control circuitry. With the high gap being farther away, however, a smaller electrical force will result from a given voltage. Therefore, in some embodiments, the stiffness of the mechanical layer of the high gap subpixels is configured to be lower than that of the other subpixel types, so that it is easier to pull down the mirror of the high gap subpixels. Similarly, the stiffness of the mechanical layer of the low gap subpixels is configured to be higher than that of the other subpixel types, so that it is harder to pull down. This allows the actuation voltage for all 3 types of subpixels to be substantially equalized.

The mechanical layer for a green, low gap subpixel is made the stiffest by adding three additional layers of material to reflective layer 440. (See FIGS. 5A, 5B and 5C.) In this example, the material is SiON ("silicon oxynitride"), but other appropriate materials may be used. The mech layer for a mid gap, red subpixel is made moderately stiff by applying two layers of SiON. (See FIGS. 5B and 5C.) The mech layer for a high gap, blue subpixel is made the least stiff by applying only one layer of SiON. (See FIG. 5C.) Vias 605 are then formed down to layer 440. (See FIG. 6A and step 165 of FIG. 1.)

"Cap" layer 607, which is an aluminum alloy in this example, is deposited over the SiON layers to complete the mechanical layer structure. (See FIG. 6B and step 170 of FIG. 1.) Cap layer 607 helps the mechanical layer to be more symmetrical. The coefficient of thermal expansion is different for aluminum than it is for SiON. If there is aluminum (or another reflective metal) on the bottom of the mechanical layer and only dielectric above the aluminum, the structure will tend to deform: when the mechanical layer is cooled to room temperature, the aluminum will tend to contract more than the dielectric and will tend to "bow up" the membrane. A curved mirror will tend to produce a range of colors instead of a single color. However, if the mechanical layer is formed in a more a symmetrical fashion, with metal layers at the top and bottom, the aluminum layers will exert an approximately equal pull on the top and the bottom of the structure. Therefore, the forces will tend to cancel out, which produces a flatter mirror.

In step 175, the mech cuts and slot cuts are formed. (See FIG. 6C.) The slot cuts and the mech cuts 610 are formed in order to isolate rows and columns of subpixels. In this example, mech cuts 610 pass perpendicularly through the plane of FIG. 6C. The slot cuts are not shown on FIG. 6C, as they are formed in substantially parallel planes above and below that of FIG. 6C in this embodiment.

Slot cuts and related features may be seen in FIGS. 7A through 7D, which depict "top down" views in a plane that is substantially orthogonal to that of FIGS. 2A through 6C. FIG. 7A depicts substantially square subpixels 705 arranged in rows 710 and columns 715.

Black mask 200 and active areas 227 may be seen in FIG. 7B. Black mask layer 200 is wider near posts 725, in order to mask both posts 725 and bending regions 727. Gaps 720 are formed in black mask 200 in order to electrically isolate one black mask row from another.

Figure 7C:
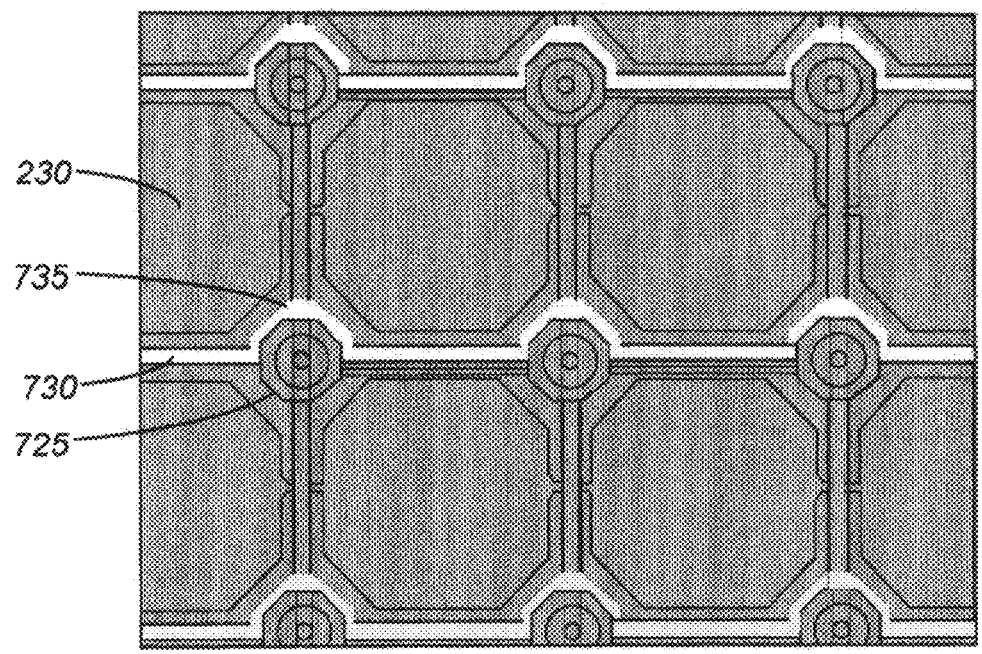
Figure 7D:
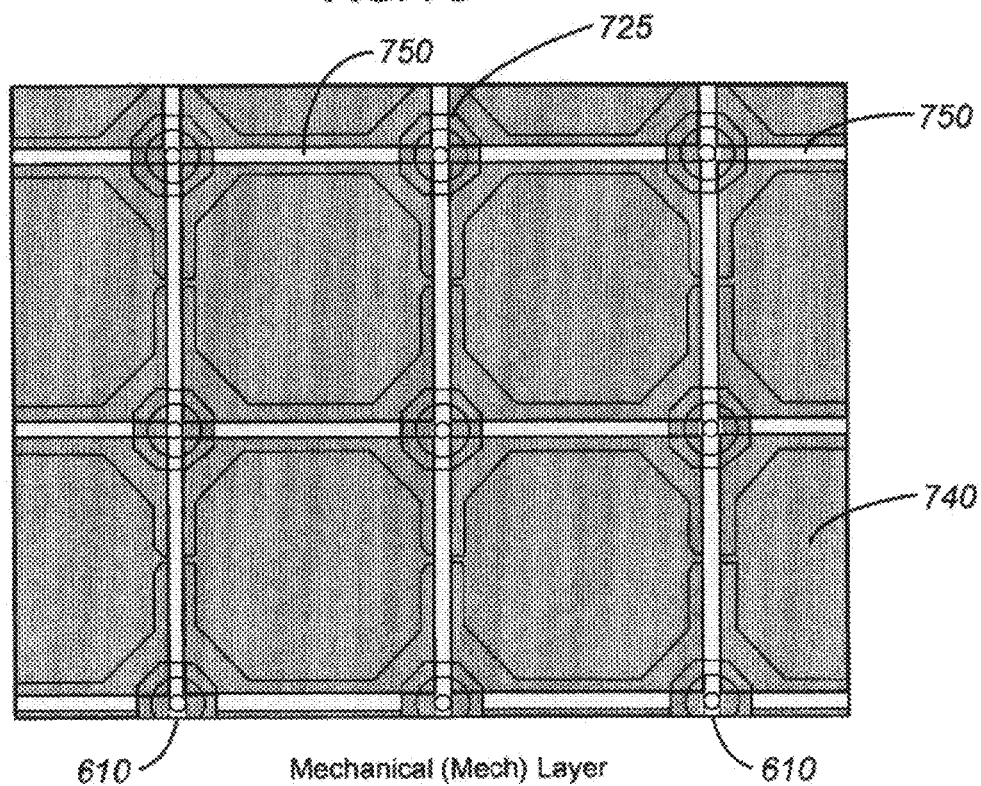

However, as noted above, layer 230 (sometimes referred to as the M1 layer) is also involved in conducting electrical signals. Therefore, as shown in FIG. 7C, rows of M1 layer 230 may be separated from one another by etching material away 730 between posts 735, and around posts 735. FIG. 7D depicts mech cuts 610, which separate columns of mechanical layer 740 in this example. FIG. 7D also depicts slot cuts 750, which extend horizontally between posts 725 in this example.

After the slot cuts and mech cuts are formed in step 175, sacrificial material 305 is released in step 180. Releasing sacrificial material 305 forms cavities 310, 315 and 320 within the subpixels. The depth of each subpixel cavity will correspond to the peak wavelength of light that has been selected for constructive interference between light reflected from mirror 440 and light partially reflected from layer 230. Mechanical layer 740 can be moved within this cavity from an open position, in which the subpixel's color will be produced, to a closed or "dark" position.

Figure 8A:
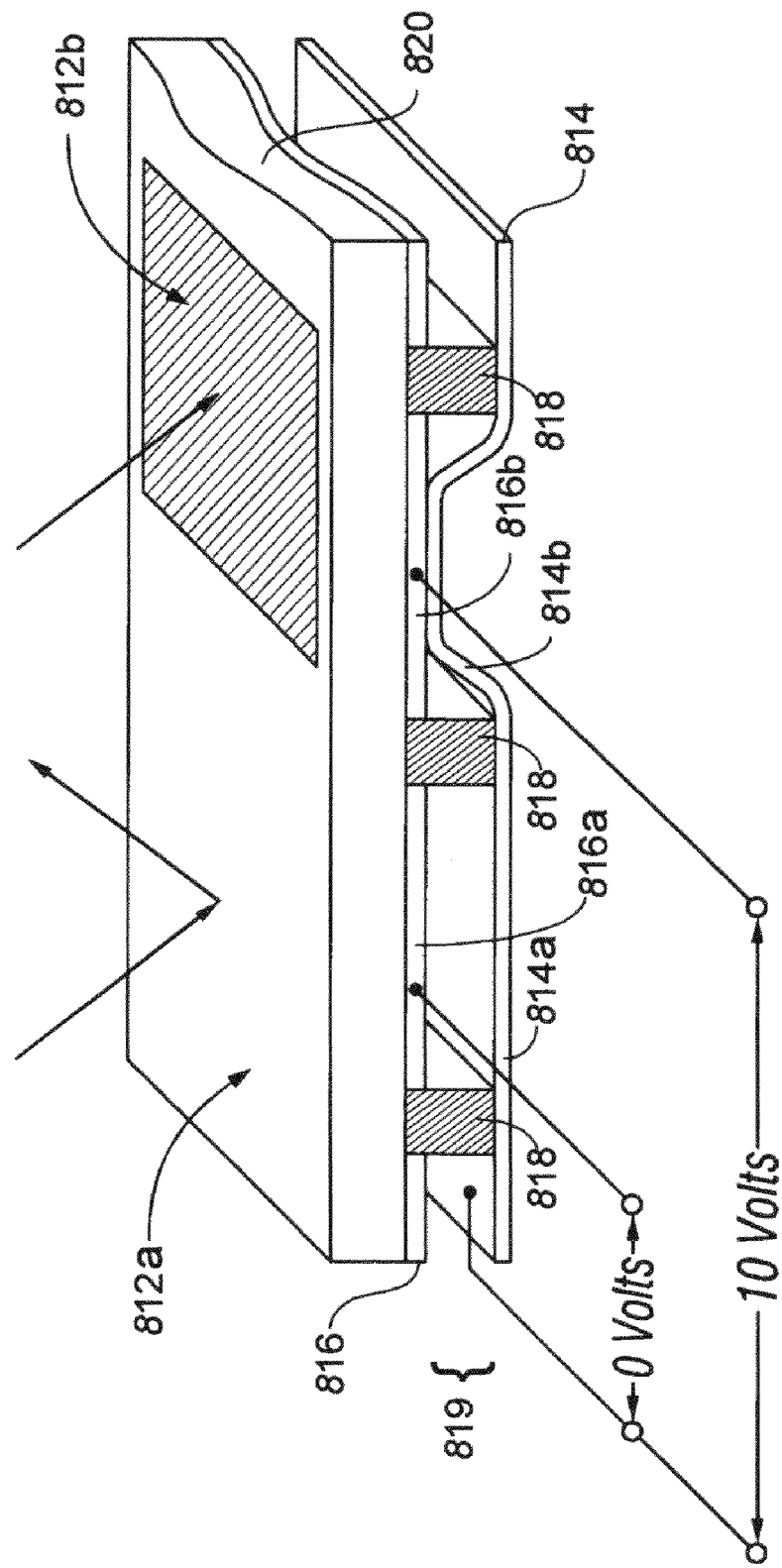
FIG. 8A is an isometric view depicting a portion of one embodiment of an interferometric modulator display in which a movable reflective layer of a first interferometric modulator is in a relaxed position and a movable reflective layer of a second interferometric modulator is in an actuated position.

FIG. 8A is an isometric view depicting two adjacent subpixels in a series of subpixels of a visual display, wherein each subpixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap ("air gap" or simply "gap") with at least one variable dimension.

In some embodiments, one of the reflective layers may be moved between at least two positions. In the first position, sometimes referred to herein as the relaxed position or the open position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each subpixel.

The depicted portion of the subpixel array in FIG. 8A includes two adjacent interferometric modulators 812a and 812b. In the interferometric modulator 812a on the left, a movable reflective layer 814a is illustrated in a relaxed position at a predetermined distance from an optical stack 816a, which includes a partially reflective layer. In the interferometric modulator 812b on the right, the movable reflective layer 814b is illustrated in an actuated position adjacent to the optical stack 816b.

The optical stacks 816a and 816b (collectively referred to as optical stack 816), as referenced herein, may comprise several fused layers, which can include an electrode layer such as indium tin oxide (ITO), a partially reflective layer, such as chromium, and a transparent dielectric. The optical stack 816 is thus partially transparent, and partially reflective. Optical stack 816 preferably contains both electrically conductive and insulating layers and may be fabricated, for example, by depositing one or more of the above layers onto a transparent substrate 820 as described herein. The insulating layer(s) are useful for preventing a short circuit when the conductive mirror of the mechanical layer touches optical stack 816. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 816 are patterned into substantially parallel strips, and may form row electrodes in a display device as described elsewhere herein. The movable reflective layers 814a, 814b may be formed as a series of substantially parallel strips of a deposited metal layer or layers (orthogonal to the row electrodes of 816a, 816b) deposited on top of posts 818 and an intervening sacrificial material deposited between the posts 818. When the sacrificial material is etched away, the movable reflective layers 814a, 814b are separated from the optical stacks 816a, 816b by a defined gap 819. A highly conductive and reflective material such as aluminum may be used for the reflective layers 814, and these strips may form column electrodes in a display device.

With no applied voltage, the gap 819 remains between the movable reflective layer 814a and optical stack 816a, with the movable reflective layer 814a in a mechanically relaxed state, as illustrated by the subpixel 812a in FIG. 8. However, when a potential difference is applied to a selected row and column, the capacitor formed at the intersection of the row and column electrodes at the corresponding subpixel becomes charged, and electrostatic forces pull the electrodes together. If the voltage is high enough, the movable reflective layer 814 is deformed and is forced against the optical stack 16. A dielectric layer (not illustrated in this Figure) within the optical stack 816 may prevent shorting and control the separation distance between layers 814 and 816, as illustrated by subpixel 12b on the right in FIG. 8. The behavior is the same regardless of the polarity of the applied potential difference. In this way, row/column actuation can control the reflective vs. non-reflective subpixel states.

Figure 8B:
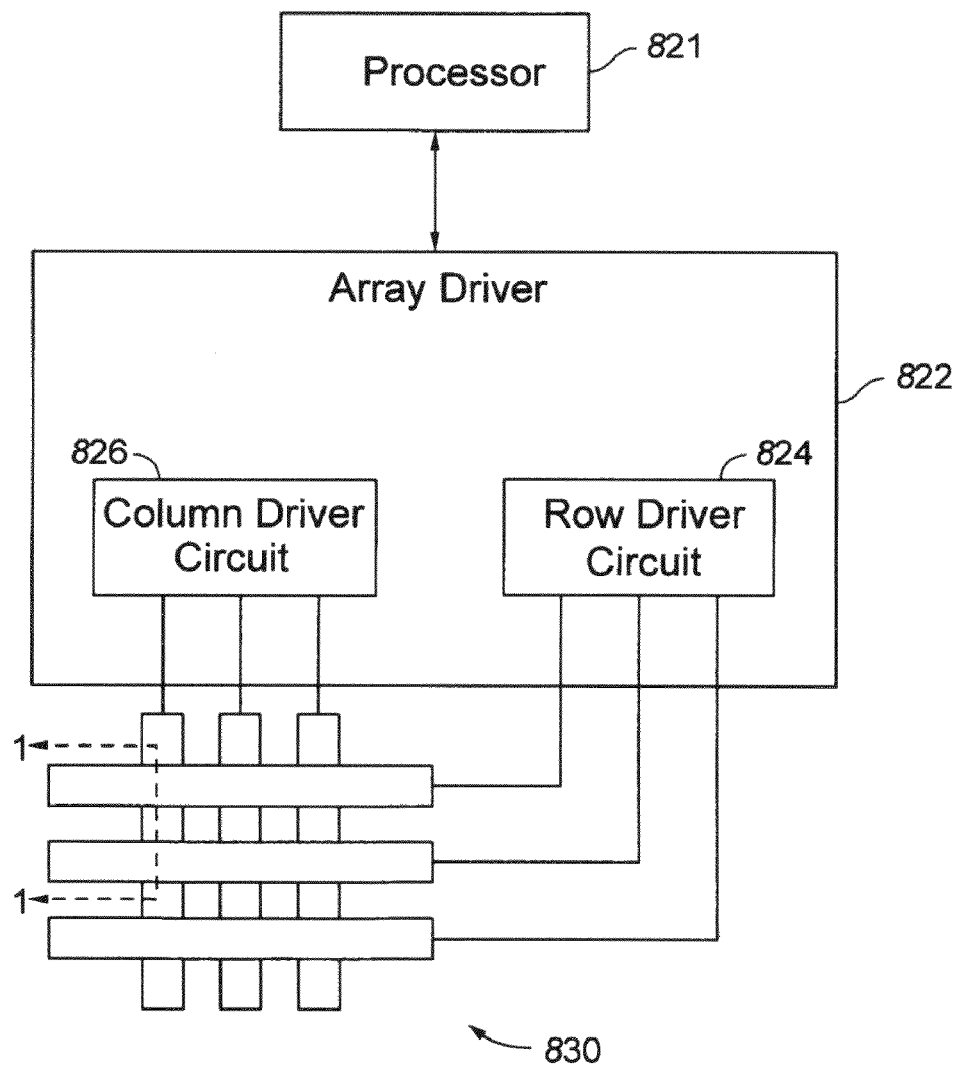
FIG. 8B is a block diagram illustrating one embodiment of control circuitry for rows and columns of interferometric modulators.

FIG. 8B is a system block diagram illustrating one embodiment of an electronic device that may incorporate interferometric modulators. The electronic device includes a processor 821 which may be any appropriate single- or multi-chip microprocessor such as an ARM®, Pentium®, 8051, MIPS®, Power PC®, or ALPHA®, or any special purpose microprocessor such as a digital signal processor, microcontroller, or a programmable gate array. The processor 821 may be configured to execute one or more software modules. In addition to executing an operating system, the processor may be configured to execute one or more software applications, including a web browser, a telephone application, an email program, or any other software application.

In one embodiment, the processor 821 is also configured to communicate with an array driver 822. The array driver is one example of what may be referred to herein as "control circuitry" or the like. In one embodiment, the array driver 822 includes a row driver circuit 824 and a column driver circuit 826 that provide signals to a display array or panel 830. The cross section of the array illustrated in FIG. 8A is shown by the lines 1-1 in FIG. 8B. Note that although FIG. 8B illustrates a 3×3 array of interferometric modulators for the sake of clarity, the display array 830 may contain a very large number of interferometric modulators, and may have a different number of interferometric modulators in rows than in columns (e.g., 300 pixels per row by 190 pixels per column).

Although some of the interferometric modulators described above include substantially square subpixels, in other embodiments described herein at least some subpixels in an interferometric modulator display are formed in a triangular shape. Although the subpixel geometry, addressing, etc., for triangular subpixel arrays may differ in some respects from those of square subpixel arrays, triangular subpixel arrays may be formed by substantially similar processes, and in substantially the same sequence, as those used to form square subpixel arrays. For example, triangular subpixel arrays may be formed according to the process described above, except that the geometries of the mech cuts, slot cuts, etc., may differ. Therefore, different processing masks may be used in these steps to form triangular subpixel arrays.

Arrays of triangular subpixels described herein can be formed with a greater active area than arrays of square subpixels. Accordingly, displays that include an array of triangular subpixels can provide increased brightness.

Figure 9:
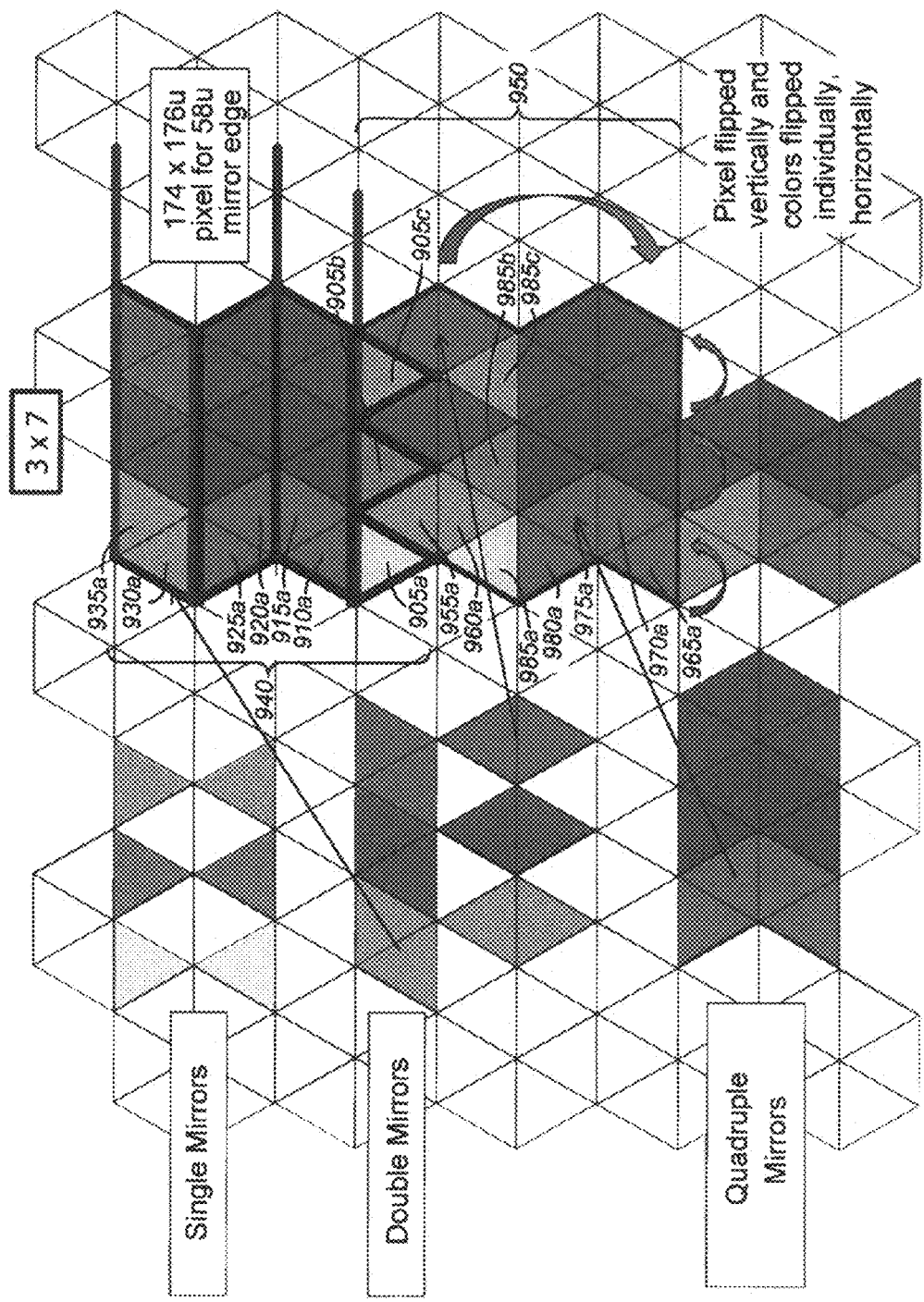
FIG. 9 depicts triangular subpixels that may be addressed individually or in groups of 1, 2, or 4.

Such triangular subpixels may be formed and/or addressed in a variety of manners. In some embodiments, for example, at least some individual triangular subpixels are configured to be separately addressable. Referring now to FIG. 9, for example, red triangular subpixel 905*a*, green triangular subpixel 905*b* and blue triangular subpixel 905*c* are configured to be separately addressable.

In some embodiments, however, a plurality of triangular subpixels are configured to be addressable as a group, e.g., as a group of 2, 3, 4 or more. For example, triangular subpixels 910*a*, 915*a*, 920*a* and 925*a* are configured to be addressable as a group of four. Triangular subpixels 930*a* and 935*a* are configured to be addressable as a group of two.

Depending on the embodiment, a single pixel may include varying numbers of triangular subpixels. For example, a single pixel may include 3, 6, 9, 12, 15, 18, 21 or some other number of triangular subpixels. Pixel 940 of FIG. 9 provides one such example. Pixel 940 is formed of 7 red subpixels, 7 green subpixels and 7 blue subpixels, for a total of 21 subpixels. Such a pixel may sometimes be referred to herein as a "3 by 7" pixel or the like.

Moreover, a single pixel may include triangular subpixels that are configured to be separately addressable and/or triangular subpixels are configured to be addressable as a group. For example, a single pixel may include separately addressable triangular subpixels, triangular subpixels that are configured to be addressed in pairs, triangular subpixels that are configured to be addressed in groups of 3 or 4, etc.

Referring again to pixel 940, red triangular subpixel 905*a*, green triangular subpixel 905*b* and blue triangular subpixel 905*c* are configured to be separately addressable. Triangular subpixels 930*a* and 935*a*, along with their green and blue counterparts, are configured to be addressable as groups of two subpixels. Triangular subpixels 910*a*, 915*a*, 920*a* and 925*a*, along with their green and blue counterparts, are configured to be addressable as groups of four subpixels.

The next pixel in the column is pixel 950. In this example, the subpixels in the lowest row of pixel 940 (905*a*, 905*b* and 905*c*) are individually addressable, whereas the subpixels in the top row of pixel 950 (red subpixel 955*a* and its green and blue counterparts) are configured to be addressed as groups of two subpixels: red subpixels 955*a* and 960*a* are configured to be addressed together. Triangular subpixels 965*a*, 970*a*, 975*a* and 980*a*, as well as their green and blue counterparts, are configured to be addressable as groups of four subpixels. Subpixels 985*a*, 985*b* and 985*c* are configured to be separately addressable.

FIG. 10 illustrates subpixel groupings according to other embodiments. Pixels 1005 and 1010 may be formed as substantially similar to pixels 940 and 950, except that the lowest row of subpixels forming pixel 1010 is offset to the right. Alternatively, however, pixels 1005 and 1010 may be formed by grouping the subpixels differently (e.g., each color may have 3 groups of 2 subpixels each, plus one separately addressable subpixel) or by not grouping the subpixels at all.

Similarly, 3 by 6 pixel 1015 may be formed using various groupings of subpixels. In one such embodiment, the six red subpixels of pixel 1015 include 3 groups of 2 subpixels each. The green and blue subpixels may be grouped in the same way. In alternative embodiments, the six red subpixels of pixel 1015 include 2 groups of 3 subpixels each or a 2-subpixel group and a 4-subpixel group. In yet other embodiments, each subpixel may be separately addressable. Pixel 1020 may be formed by inverting the structure of pixel 1015.

As with square subpixels, triangular subpixels of the same color may be organized substantially into "columns." However, as can be observed in FIGS. 9 and 10, the columns are not necessarily formed of straight lines. A row of subpixels may be separately addressable or the row may be addressed along with one or more other rows. However each color "column" may, depending on the embodiment, involve a single column electrode or more than one column electrode.

Accordingly, many layouts for addressing arrays of triangular subpixels are contemplated by the inventor. One example of row layouts for such an array is set forth in FIG. 11A. Here, separately addressable subpixels 1105 are adjacent to subpixels 1110*a*, which are addressable in groups of two. Slots 730 isolate the corresponding portions of layer 230 into single subpixels and groups of two subpixels that will be driven together. Black mask layer 200 underlies layer 230 and provides busing across the subpixel array.

Figure 11B:
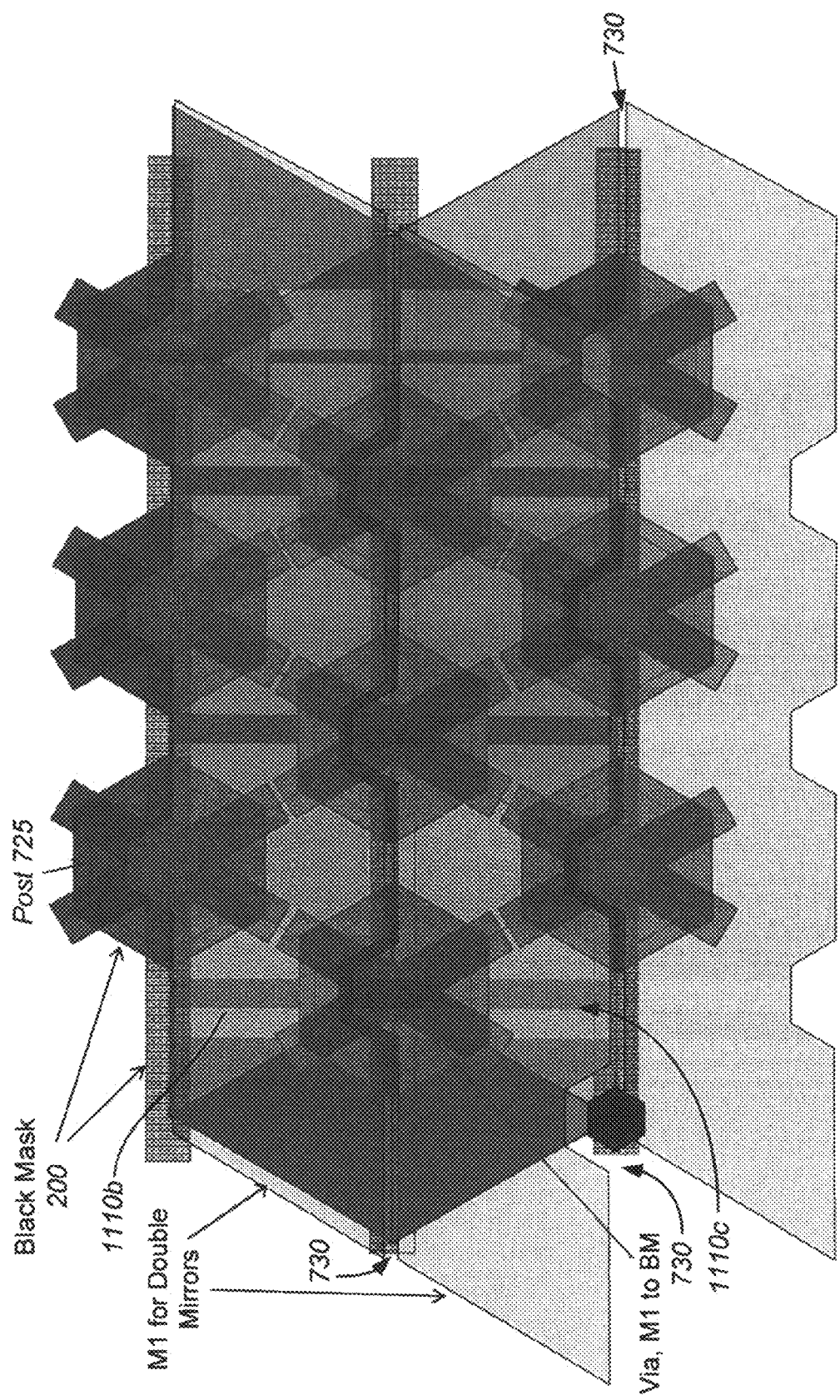
FIG. 11B depicts apparatus for addressing triangular subpixels in groups of 2, according to some embodiments.
Figure 11C:
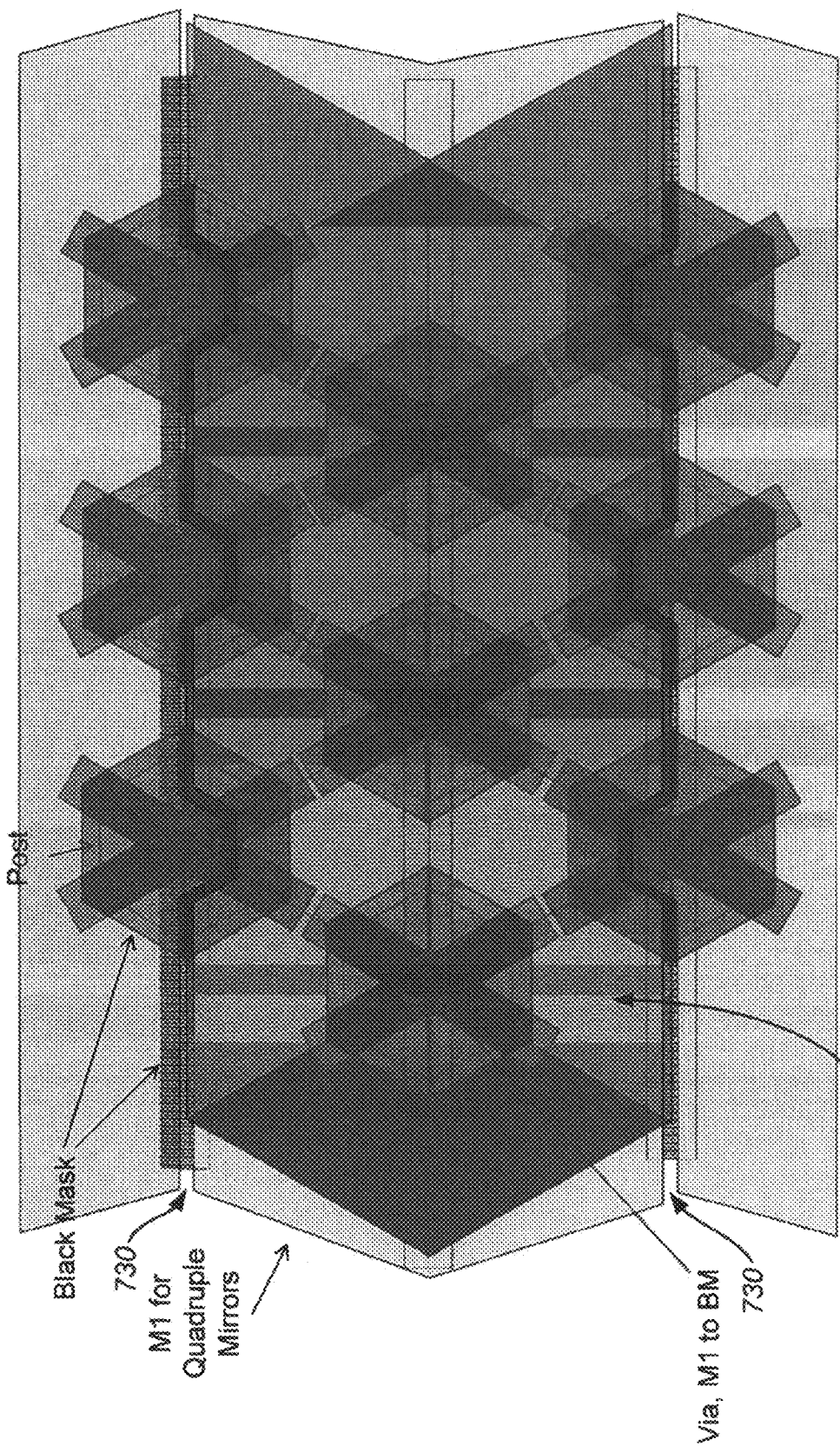
FIG. 11C depicts apparatus for addressing triangular subpixels in groups of 4, according to some embodiments.

Another example of row layouts is set forth in FIG. 11B. Here, subpixels 1110*b* are adjacent to subpixels 1110*c*, both of which are addressable in groups of two. However, the orientations of subpixels 1110*b* and 1110*c* are different from that of subpixel 1110*a* of FIG. 11A. Therefore, a different geometry of slots 730 is used to isolate the corresponding portions of layer 230 into multiple groups of two subpixels. As before, black mask layer 200 underlies layer 230 and provides busing across the subpixel array. FIG. 11C illustrates one example of a slot geometry for isolating appropriate segments of layer 230 so that groups 1115 of 4 subpixels may be driven together.

Figure 12A:
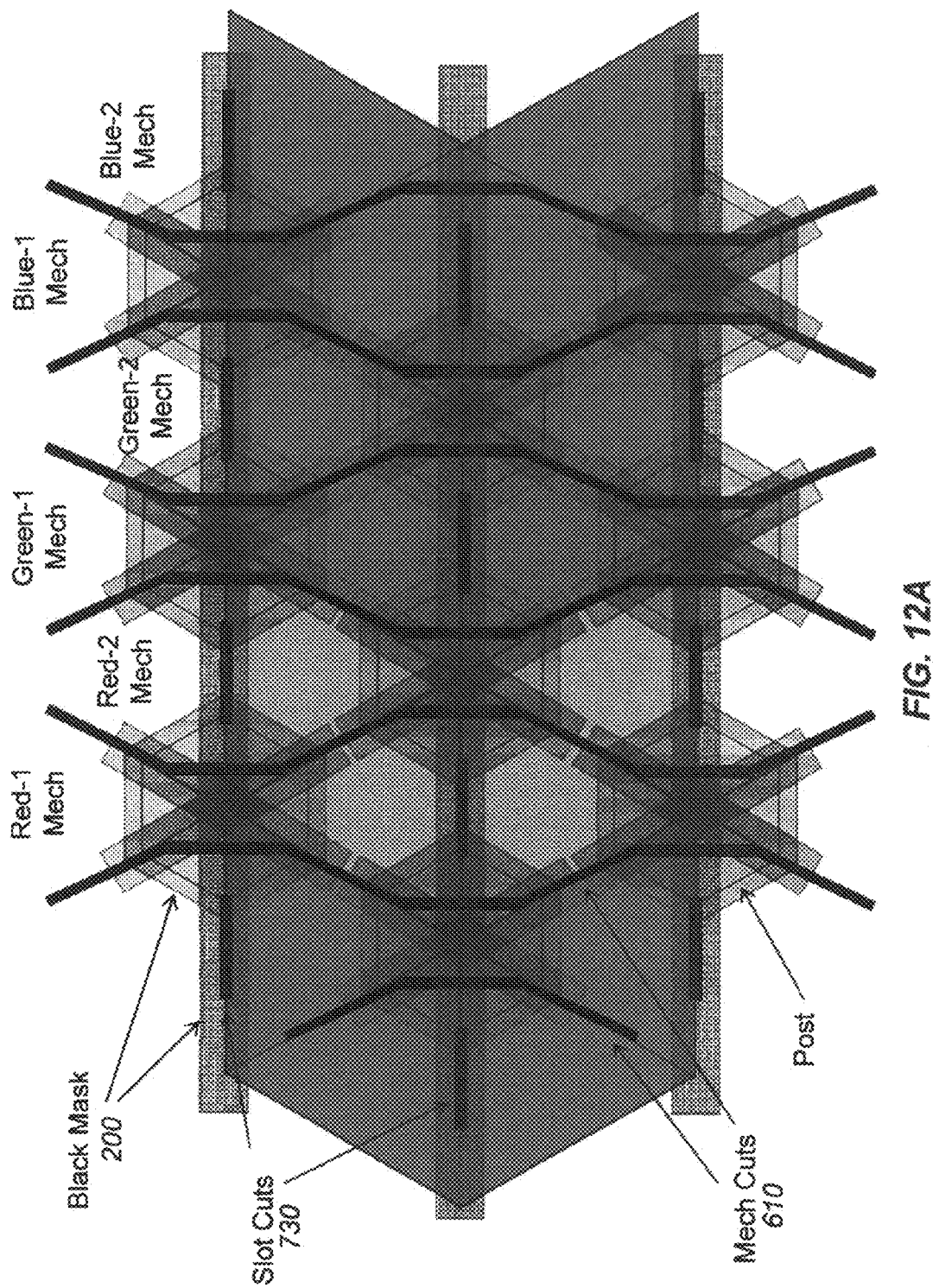
FIG. 12A depicts slot cuts and mech lines for addressing pixels formed by 18 triangular subpixels according to some embodiments.

Some examples of column layouts for triangular subpixel arrays will now be described. FIG. 12A depicts a layout of slot cuts, mech cuts and mech lines according to some embodiments. This example is intended for 3 by 6 pixels, though the same general concepts could apply to pixels having other numbers of subpixels. As shown in FIG. 12A, two mech cuts 610 form two columns for each subpixel color in this example. Accordingly, two mech lines are used for addressing each pixel color.

Figure 12B:
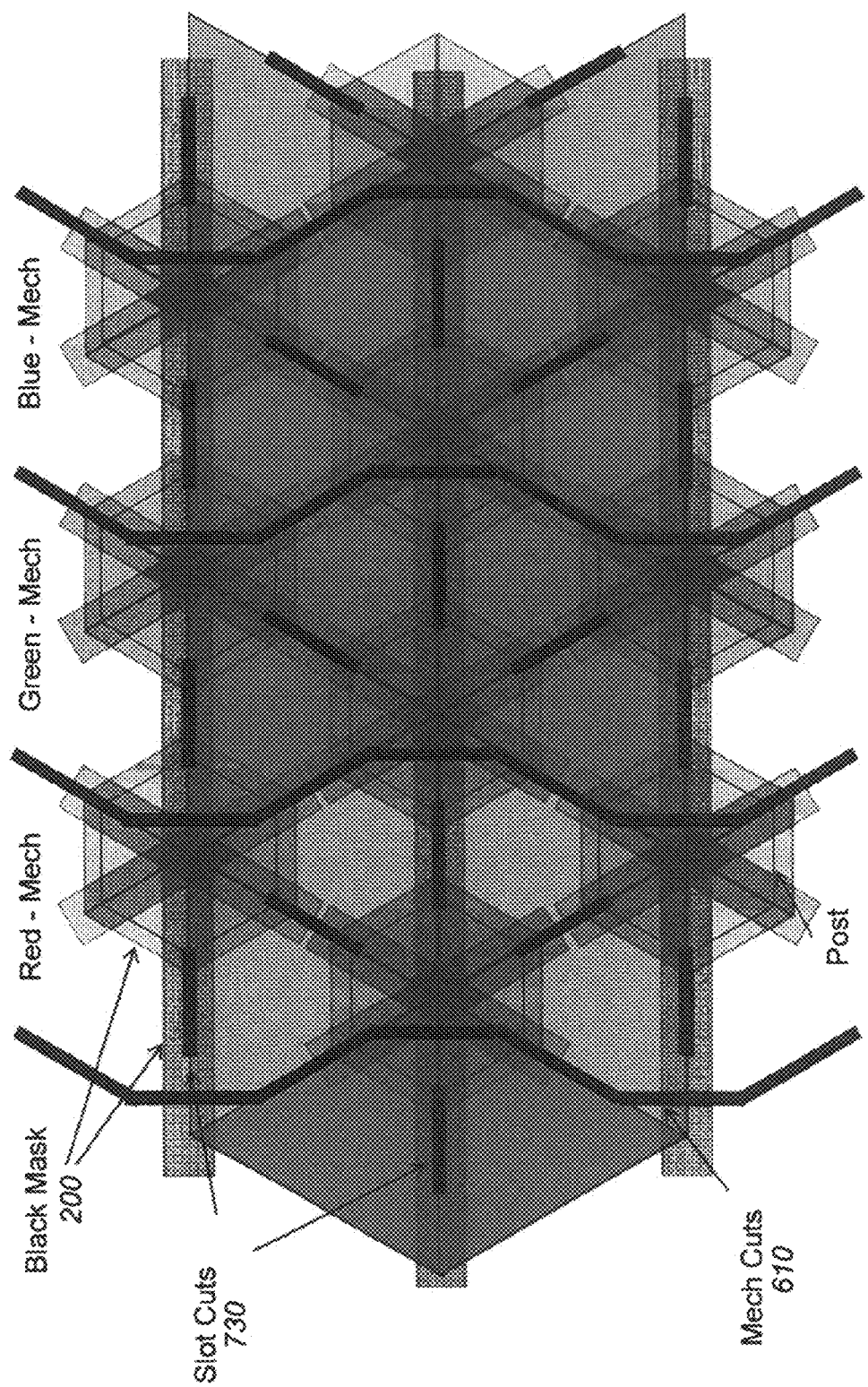
FIG. 12B illustrates slot cuts and mech lines for addressing pixels formed by 21 triangular subpixels according to some embodiments.
Figure 12C:
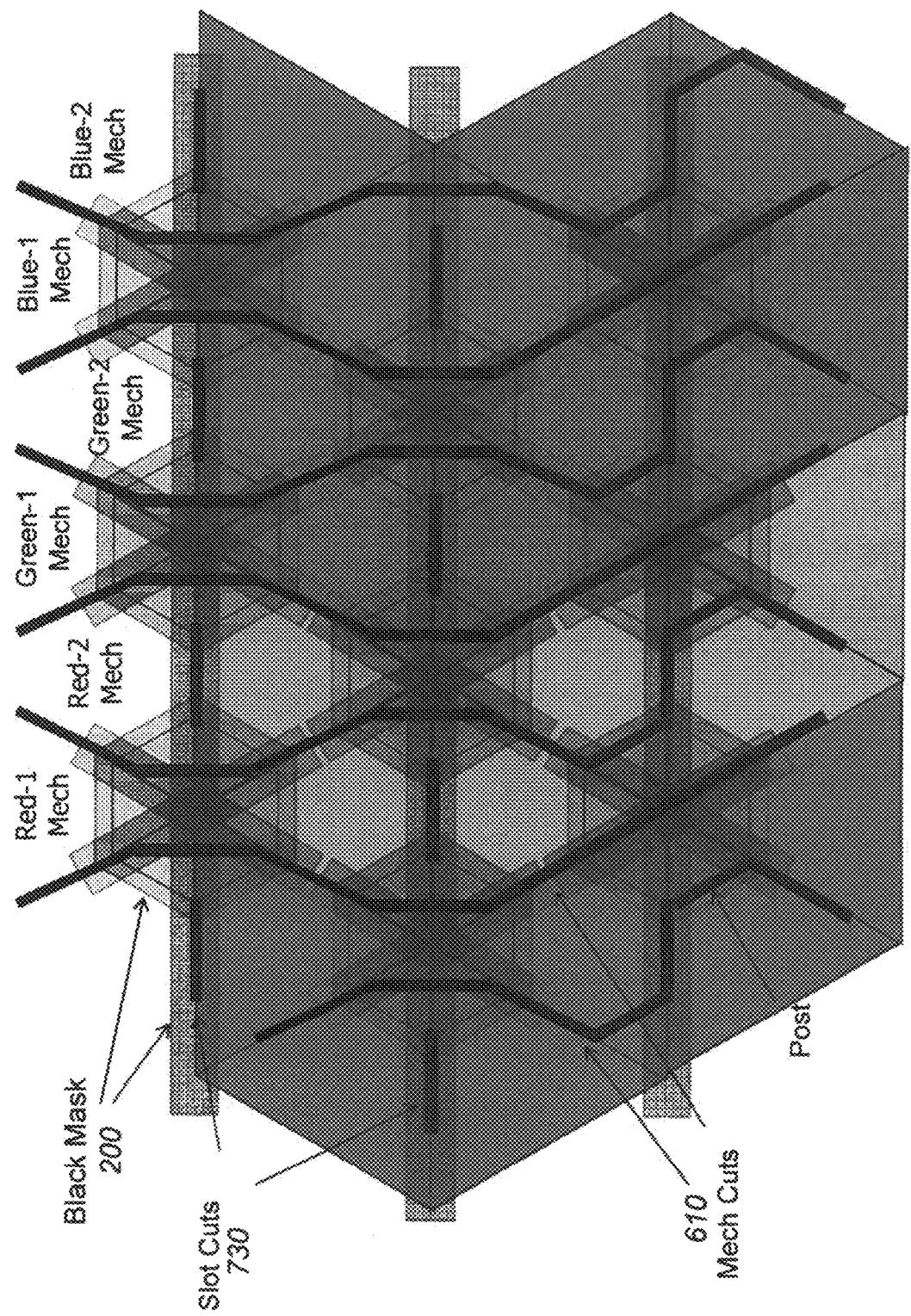
FIG. 12C illustrates slot cuts and mech lines for addressing pixels formed by 21 triangular subpixels according to other embodiments.

FIG. 12B illustrates an alternative layout that is primarily intended for pixels formed of 21 triangular subpixels, though the basic design could be used for other pixel types. Here, mech cuts 610 form a single column for each subpixel color. Therefore, only one mech line is needed for addressing each pixel color. FIG. 12C illustrates another layout that is primarily intended for pixels formed of 21 triangular subpixels. As with the other layouts shown herein, the basic design could be used for other pixel types. Like the example shown in FIG. 12A, two mech cuts 610 form two columns for each subpixel color in this example. Accordingly, two mech lines are used for addressing each pixel color.

As we have seen, forming arrays of triangular subpixels can introduce some level of complexity into the design and the addressing process. However, the different mech cuts, slot cuts, etc., can be formed substantially at the same time as in previous processes, e.g., as part of step 175 of FIG. 1.

Moreover, substantial increases in fill factor and brightness can be achieved as a result of the added complexity. Some square subpixels produced by the current assignee are 38μ on a side. Therefore, these square subpixels have an area of 1444μ$^2$. The current fill of these displays having square subpixels and 18μ posts is approximately 67%. Some displays having triangular subpixel embodiments that are described herein are formed of triangles that are approximately 58μ on a side. These triangular subpixels have an area of approximately $1457\mu^2$ and a fill factor of approximately 71%, when fabricated with $18\mu$ posts.

Some triangular subpixel embodiments that are described herein may formed with smaller posts, e.g., with $12\mu$ posts. Some such designs have a fill factor of approximately 73%. Accordingly, some embodiments provided herein result in a fill factor that is 4% to 6% greater than that of previous designs. This increased fill factor translates directly into increased brightness for the corresponding reflective displays.

Figure 12D:
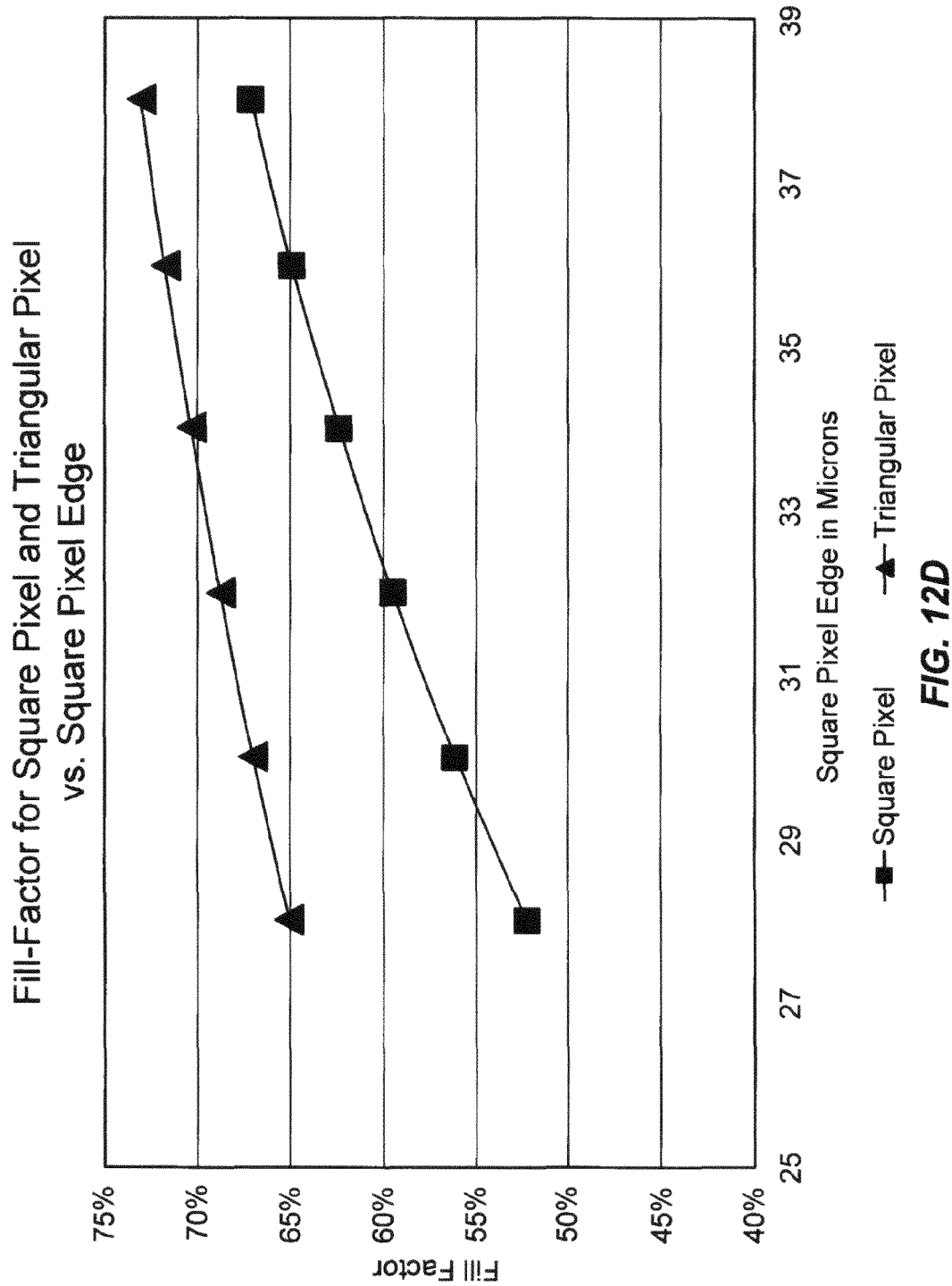
FIG. 12D is a graph that compares fill factors for square subpixels and triangular subpixels.

As noted in FIG. 12D, the improvement in fill factor for a triangular subpixel relative to a corresponding square subpixel of the same area may actually increase as subpixels are made smaller. With a square pixel edge of 38 microns (and the other specifications of the design used to produce the underlying data, such as post size), the increase in fill factor provided by triangular subpixels can be approximately 5 or 6%. However, with a square pixel edge of 28 microns, the increase in fill factor provided by triangular subpixels can be approximately 12 or 13%.

Figure 13A:
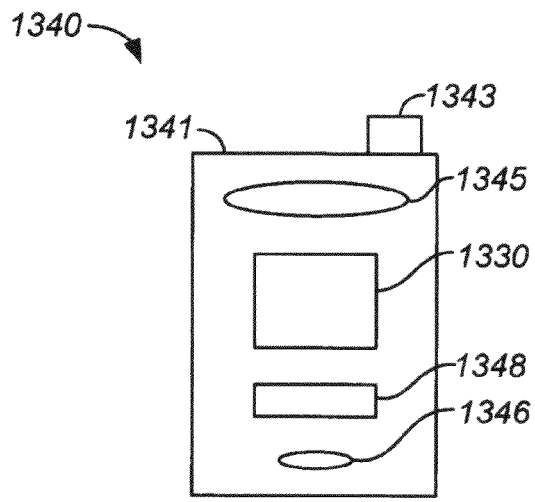
FIGS. 13A and 13B are block diagrams illustrating an embodiment of a display device.
Figure 13B:
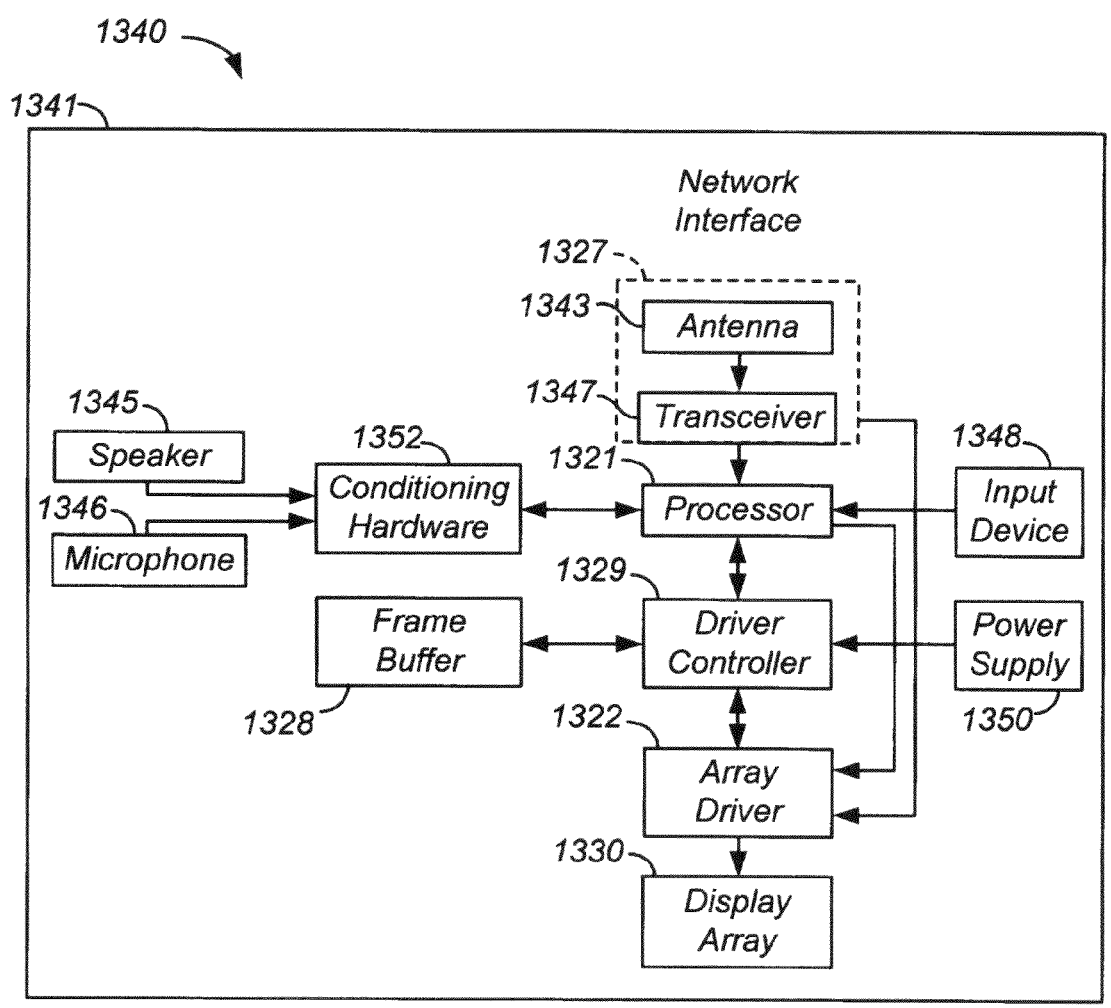

FIGS. 13A and 13B are system block diagrams illustrating an embodiment of a display device 1340. The display device 1340 can be, for example, a portable device such as a cellular or mobile telephone, a personal digital assistant ("PDA"), etc. However, the same components of display device 1340 or slight variations thereof are also illustrative of various types of display devices such as televisions and portable media players.

This example of display device 1340 includes a housing 1341, a display 1330, an antenna 1343, a speaker 1345, an input system 1348, and a microphone 1346. The housing 1341 is generally formed from any of a variety of manufacturing processes as are well known to those of skill in the art, including injection molding and vacuum forming. In addition, the housing 1341 may be made from any of a variety of materials, including, but not limited to, plastic, metal, glass, rubber, and ceramic, or a combination thereof. In one embodiment, the housing 1341 includes removable portions (not shown) that may be interchanged with other removable portions of different color, or containing different logos, pictures, or symbols.

The display 1330 in this example of the display device 1340 may be any of a variety of displays. Moreover, although only one display 1330 is illustrated in FIG. 1, display device 1340 may include more than one display 1330. For example, the display 1330 may comprise a flat-panel display such as a reflective display (e.g., an interferometric modulator display), a plasma display, an electroluminescent (EL) display, a light-emitting diode (LED) (e.g., organic light-emitting diode (OLED)), a transmissive display such as a liquid crystal display (LCD), and/or a bi-stable display, etc. Alternatively, display 1330 may comprise a non-flat-panel display, such as a cathode ray tube (CRT) or other tube device, as is well known to those of skill in the art. However, for the embodiments of primary interest in this application, the display 1330 includes at least one transmissive display.

The components of one embodiment in this example of display device 1340 are schematically illustrated in FIG. 13B. The illustrated display device 1340 includes a housing 1341 and can include additional components at least partially enclosed therein. For example, in one embodiment, the display device 1340 includes a network interface 1327 that includes an antenna 1343, which is coupled to a transceiver 1347. The transceiver 1347 is connected to a processor 1321, which is connected to conditioning hardware 1352. The conditioning hardware 1352 may be configured to condition a signal (e.g., filter a signal). The conditioning hardware 1352 is connected to a speaker 1345 and a microphone 1346. The processor 1321 is also connected to an input system 1348 and a driver controller 1329. In this example, the driver controller 1329 is coupled to a frame buffer 1328 and to an array driver 1322, which in turn is coupled to a display array 1330. A power supply 1350 provides power to all components as required by the particular display device 1340 design.

The network interface 1327 includes the antenna 1343 and the transceiver 1347 so that the display device 1340 can communicate with one or more devices over a network. In some embodiments, the network interface 1327 may also have some processing capabilities to relieve requirements of the processor 1321. The antenna 1343 may be any antenna known to those of skill in the art for transmitting and receiving signals. In one embodiment, the antenna is configured to transmit and receive RF signals according to an Institute of Electrical and Electronics Engineers (IEEE) 802.11 standard, e.g., IEEE 802.11(a), (b), or (g). In another embodiment, the antenna is configured to transmit and receive RF signals according to the BLUETOOTH standard. In the case of a cellular telephone, the antenna may be designed to receive Code Division Multiple Access ("CDMA"), Global System for Mobile communications ("GSM"), Advanced Mobile Phone System ("AMPS") or other known signals that are used to communicate within a wireless cell phone network. The transceiver 1347 may pre-process the signals received from the antenna 1343 so that the signals may be received by, and further manipulated by, the processor 1321. The transceiver 1347 may also process signals received from the processor 1321 so that the signals may be transmitted from the display device 1340 via the antenna 1343.

In an alternative embodiment, the transceiver 1347 may be replaced by a receiver and/or a transmitter. In yet another alternative embodiment, network interface 1327 may be replaced by an image source, which may store and/or generate image data to be sent to the processor 1321. For example, the image source may be a digital video disk (DVD) or a hard disk drive that contains image data, or a software module that generates image data. Such an image source, transceiver 1347, a transmitter and/or a receiver may be referred to as an "image source module" or the like.

Processor 1321 may be configured to control the overall operation of the display device 1340. The processor 1321 may receive data, such as compressed image data from the network interface 1327 or an image source, and process the data into raw image data or into a format that is readily processed into raw image data. The processor 1321 may then send the processed data to the driver controller 1329 or to frame buffer 1328 for storage. Raw data typically refers to the information that identifies the image characteristics at each location within an image. For example, such image characteristics can include color, saturation, and gray-scale level.

In one embodiment, the processor 1321 may include a microcontroller, central processing unit ("CPU"), or logic unit to control operation of the display device 1340. Conditioning hardware 1352 generally includes amplifiers and filters for transmitting signals to the speaker 1345, and for receiving signals from the microphone 1346. Conditioning hardware 1352 may be discrete components within the display device 1340, or may be incorporated within the processor 1321 or other components. Processor 1321, driver controller 1329, conditioning hardware 1352 and other components that may be involved with data processing may sometimes be referred to herein as parts of a "logic system" or the like.

The driver controller 1329 may be configured to take the raw image data generated by the processor 1321 directly from the processor 1321 and/or from the frame buffer 1328 and reformat the raw image data appropriately for high speed transmission to the array driver 1322. Specifically, the driver controller 1329 may be configured to reformat the raw image data into a data flow having a raster-like format, such that it has a time order suitable for scanning across the display array 1330. Then the driver controller 1329 may send the formatted information to the array driver 1322. Although a driver controller 1329, such as a LCD controller, is often associated with the system processor 1321 as a stand-alone integrated circuit ("IC"), such controllers may be implemented in many ways. For example, they may be embedded in the processor 1321 as hardware, embedded in the processor 1321 as software, or fully integrated in hardware with the array driver 1322. An array driver 1322 that is implemented in some type of circuit may be referred to herein as a "driver circuit" or the like.

The array driver 1322 may be configured to receive the formatted information from the driver controller 1329 and reformat the video data into a parallel set of waveforms that are applied many times per second to the plurality of leads coming from the display's x-y matrix of pixels. These leads may number in the hundreds, the thousands or more, according to the embodiment.

In some embodiments, the driver controller 1329, array driver 1322, and display array 1330 may be appropriate for any of the types of displays described herein. For example, in one embodiment, driver controller 1329 may be configured for controlling an array of interferometric pixels and subpixels or another type of bi-stable display. Alternatively, driver controller 1329 may be a transmissive display controller, such as an LCD display controller. In some embodiments, a driver controller 1329 may be integrated with the array driver 1322. Such embodiments may be appropriate for highly integrated systems such as cellular phones, watches, and other devices having small area displays. In yet another embodiment, display array 1330 may comprise a display array such as a bi-stable display array (e.g., a display including an array of interferometric modulators).

The input system 1348 allows a user to control the operation of the display device 1340. In some embodiments, input system 1348 includes a keypad, such as a QWERTY keyboard or a telephone keypad, a button, a switch, a touch-sensitive screen, or a pressure- or heat-sensitive membrane. In one embodiment, the microphone 1346 may comprise at least part of an input system for the display device 1340. When the microphone 1346 is used to input data to the device, voice commands may be provided by a user for controlling operations of the display device 1340.

Power supply 1350 can include a variety of energy storage devices. For example, in some embodiments, power supply 1350 may comprise a rechargeable battery, such as a nickel-cadmium battery or a lithium ion battery. In another embodiment, power supply 1350 may comprise a renewable energy source, a capacitor, or a solar cell such as a plastic solar cell or solar-cell paint. In some embodiments, power supply 1350 may be configured to receive power from a wall outlet.

In some embodiments, control programmability resides, as described above, in a driver controller which can be located in several places in the electronic display system. In some embodiments, control programmability resides in the array driver 1322.

As will be apparent from the foregoing description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Although illustrative embodiments and applications of this invention are shown and described herein, many variations and modifications are possible which remain within the concept, scope, and spirit of the invention, and these variations should become clear after perusal of this application. For example, although various interferometric modulator designs are described above, interferometric modulators having triangular subpixels may be fabricated in accordance with other interferometric modulator designs.

Figure 14A:
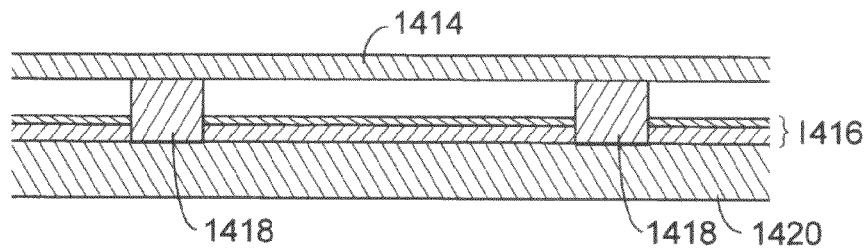
FIG. 14A is a cross section of an interferometric modulator.
Figure 14B:
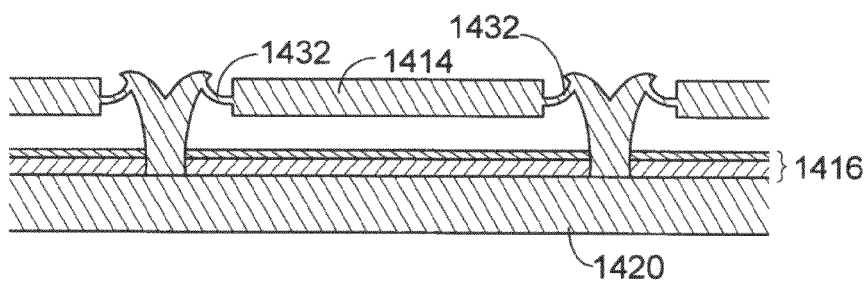
FIG. 14B is a cross section of an alternative embodiment of an interferometric modulator.
Figure 14C:
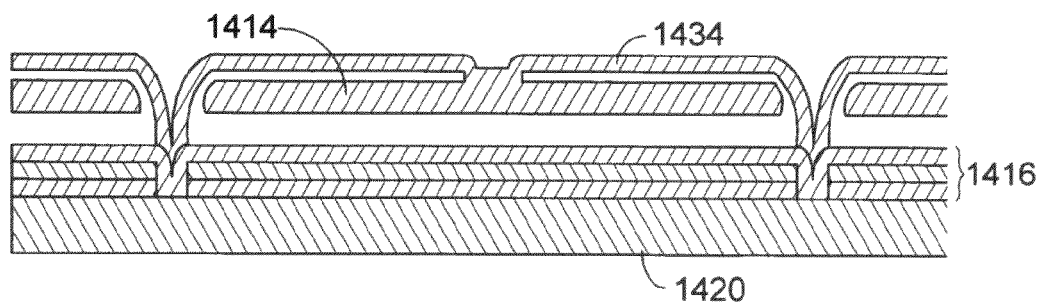
FIG. 14C is a cross section of another alternative embodiment of an interferometric modulator.

The structural details of interferometric modulators that can operate in accordance with the principles set forth above may vary widely. FIGS. 14A-14E illustrate five different embodiments of the movable reflective layer 1414 and its supporting structures. FIG. 14A is a cross section of an embodiment wherein a strip of metal material 1414 is deposited on orthogonally extending supports 1418. In FIG. 14B, the moveable reflective layer 1414 is attached to supports at the corners only, on tethers 1432. In FIG. 14C, the moveable reflective layer 1414 is suspended from a deformable layer 1434, which may comprise a flexible metal. The deformable layer 1434 connects, directly or indirectly, to the substrate 1420 around the perimeter of the deformable layer 1434. These connections are herein referred to as support posts.

Figure 14D:
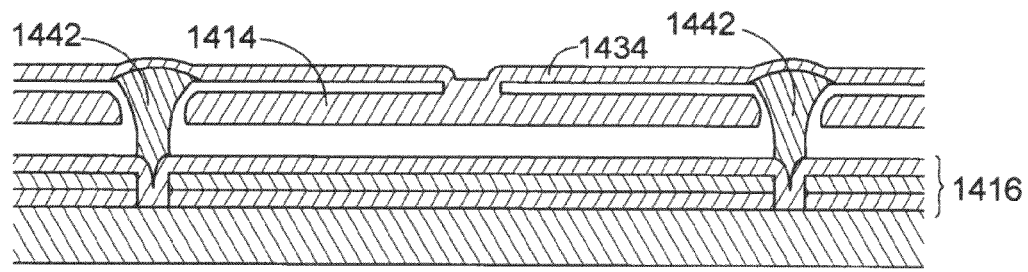
FIG. 14D is a cross section of yet another alternative embodiment of an interferometric modulator.

The embodiment illustrated in FIG. 14D has support post plugs 1442 upon which the deformable layer 1434 rests. The movable reflective layer 1414 remains suspended over the gap, but the deformable layer 1434 does not form the support posts by filling holes between the deformable layer 1434 and the optical stack 1416. Rather, the support posts are formed of a planarization material, which is used to form support post plugs 1442.

Figure 14E:
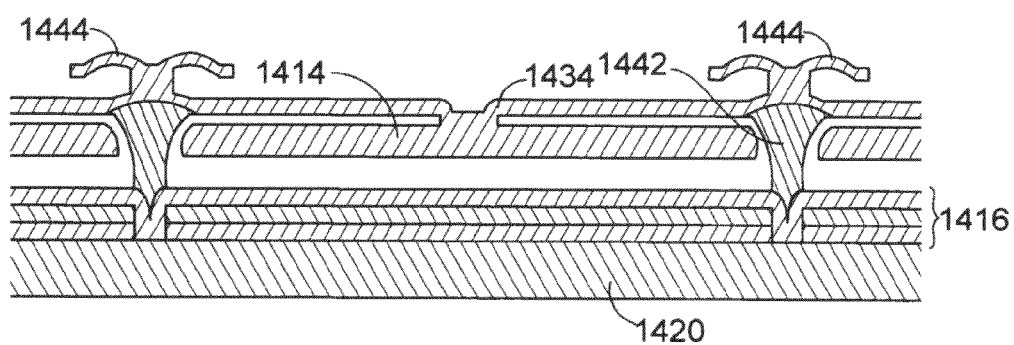
FIG. 14E is a cross section of an additional alternative embodiment of an interferometric modulator.

The embodiment illustrated in FIG. 14E is based on the embodiment shown in FIG. 14D, but may also be adapted to work with any of the embodiments described above, as well as additional embodiments not shown. In the embodiment shown in FIG. 14E, an extra layer of metal or other conductive material has been used to form a bus structure 1444. This allows signal routing along the back of the interferometric modulators, eliminating a number of electrodes that may otherwise have had to be formed on the substrate 1420.

In various embodiments shown herein the interferometric modulators function as direct-view devices, in which images are viewed from the front side of the transparent substrate 1420, the side opposite to that upon which the modulator is arranged. In these embodiments, the reflective layer 1414 optically shields the portions of the interferometric modulator on the side of the reflective layer opposite the substrate 1420, including the deformable layer 1434. Such configurations allow the shielded areas to be configured and operated upon without negatively affecting the image quality. Such shielding allows the bus structure 1444 in FIG. 14E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other.

Moreover, the embodiments shown in FIGS. 14C-14E have additional benefits deriving from the decoupling of the optical properties of the reflective layer 1414 from its mechanical properties, which are carried out by the deformable layer 1434. This allows the structural design and materials used for the reflective layer 1414 to be optimized with respect to the optical properties, and the structural design and materials used for the deformable layer 1434 to be optimized with respect to desired mechanical properties.

Accordingly, the present embodiments are to be considered as illustrative and not restrictive, and the invention is not to be limited to the details given herein, but may be modified within the scope and equivalents of the appended claims.

I claim:

1. An apparatus, comprising:
   a substantially transparent substrate;
   an array of triangular interferometric modulation subpixels disposed on the substantially transparent substrate, the subpixels comprising two substantially triangular walls that define a cavity, one of the walls being movable relative to the other through a range of positions, the walls causing the cavity to operate interferometrically in at least one of the positions, producing an optical response to visible light that enters the subpixels;
   a plurality of electrodes configured for conducting electrical signals to the array of subpixels, wherein the plurality of electrodes comprises:
   first row electrodes configured for conducting electrical signals to single subpixels; and
   second row electrodes configured for conducting electrical signals to groups of 2 subpixels; and
   control circuitry configured to apply electrical signals for controlling the array of subpixels via the plurality of electrodes.

2. The apparatus of claim 1, wherein the control circuitry is configured to control 18 of the subpixels as a single pixel.

3. The apparatus of claim 2, wherein the single pixel comprises 6 red subpixels, 6 green subpixels and 6 blue subpixels.

4. The apparatus of claim 1, wherein the control circuitry is configured to control 21 of the subpixels as a single pixel.

5. The apparatus of claim 4, wherein the single pixel comprises 7 red subpixels, 7 green subpixels and 7 blue subpixels.

6. The apparatus of claim 5, wherein the control circuitry is configured to address 4 of the 7 red subpixels as a group.

7. The apparatus of claim 1, wherein the plurality of electrodes comprises column electrodes configured for conducting electrical signals to a column of subpixels and wherein each subpixel in the column of subpixels is configured to produce substantially the same color.

8. A display device that includes the apparatus of claim 1.

9. A mobile communication device that includes the display device of claim 8.

10. The apparatus of claim 1, further comprising:
    a display;
    a processor that is configured to communicate with the display, the processor being configured to process image data; and
    a memory device that is configured to communicate with the processor.

11. The apparatus of claim 10, further comprising:
    a driver circuit configured to send at least one signal to the display.

12. The apparatus of claim 11, further comprising:
    a controller configured to send at least a portion of the image data to the driver circuit.

13. The apparatus of claim 10, further comprising:
    an image source module configured to send the image data to the processor.

14. The apparatus of claim 13, wherein the image source module comprises at least one of a receiver, transceiver, and transmitter.

15. The apparatus of claim 10, further comprising:
    an input device configured to receive input data and to communicate the input data to the processor.

16. The apparatus of claim 1, wherein the plurality of electrodes further comprises third row electrodes configured for conducting electrical signals to groups of 3 or 4 subpixels.

17. The apparatus of claim 1, further comprising:
    first column electrodes for conducting electrical signals to a first plurality of subpixels that correspond with a first color; and
    second column electrodes for conducting electrical signals to a second plurality of subpixels that correspond with a second color.

18. The apparatus of claim 17, further comprising:
    third column electrodes for conducting electrical signals to a third plurality of subpixels that are adjacent the first plurality of subpixels and that correspond with the first color; and
    fourth column electrodes for conducting electrical signals to a fourth plurality of subpixels that are adjacent the second plurality of subpixels and that correspond with the second color.

19. The apparatus of claim 1, further comprising:
    first column electrodes for conducting electrical signals to a first plurality of subpixels that correspond with a first color; and
    second column electrodes for conducting electrical signals to a second plurality of subpixels that are adjacent the first plurality of subpixels and that also correspond with the first color.

20. An apparatus, comprising:
    a substantially transparent substrate;
    an array of triangular interferometric modulation subpixels disposed on the substantially transparent substrate, the subpixels comprising two substantially triangular walls that define a cavity, one of the walls being movable relative to the other through a plurality of positions, the walls causing the cavity to operate interferometrically in at least one of the positions, producing an optical response to visible light that enters the subpixels;
    electrode means for conducting electrical signals to the array of subpixels, wherein the electrode means comprises first row electrodes configured for conducting electrical signals to groups of 3 or 4 subpixels, each of the groups corresponding with a subpixel color; and
    control means for controlling the array of subpixels via the electrode means.

21. The apparatus of claim 20, further comprising:
    second row electrodes configured for conducting electrical signals to groups of 2 subpixels.

22. The apparatus of claim 20, further comprising:
    second row electrodes configured for conducting electrical signals to single subpixels.

23. The apparatus of claim 20, wherein the control means is configured to control 18 of the subpixels as a single pixel.

24. The apparatus of claim 23, wherein the single pixel comprises 6 red subpixels, 6 green subpixels and 6 blue subpixels.

25. The apparatus of claim 20, wherein the control means is configured to control 21 of the subpixels as a single pixel.

26. The apparatus of claim 25, wherein the single pixel comprises 7 red subpixels, 7 green subpixels and 7 blue subpixels.

* * * * *